US009423853B2

(12) United States Patent
Park et al.

(10) Patent No.: US 9,423,853 B2
(45) Date of Patent: Aug. 23, 2016

(54) SYSTEM AND METHOD FOR BALANCED USER EXPERIENCE IN A MULTIMEDIA CONFERENCING COMMUNITY

(71) Applicant: Qualcomm Incorporated, San Diego, CA (US)

(72) Inventors: Hee Jun Park, San Diego, CA (US); Jewon Kang, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 220 days.

(21) Appl. No.: 14/102,468

(22) Filed: Dec. 10, 2013

(65) Prior Publication Data

US 2015/0160709 A1    Jun. 11, 2015

(51) Int. Cl.
*G06F 1/32*         (2006.01)
*H04L 12/18*        (2006.01)
*H04N 7/15*         (2006.01)
*G09G 5/00*         (2006.01)

(52) U.S. Cl.
CPC ............ *G06F 1/3206* (2013.01); *G06F 1/3234* (2013.01); *G09G 5/005* (2013.01); *H04L 12/1827* (2013.01); *H04N 7/15* (2013.01); *G09G 2320/0613* (2013.01); *G09G 2320/08* (2013.01); *G09G 2330/021* (2013.01); *G09G 2330/045* (2013.01); *G09G 2340/0407* (2013.01); *G09G 2360/08* (2013.01); *G09G 2370/022* (2013.01)

(58) Field of Classification Search
CPC ....... G06F 1/32; G06F 3/1454; H04L 65/403; G09G 5/04
USPC ........................................................ 713/320
See application file for complete search history.

(56) References Cited

U.S. PATENT DOCUMENTS 8,471,888 B2    6/2013  George et al.
8,619,949 B2 *  12/2013 Mishra .................. H04M 3/567
                                              379/265.01

(Continued)

FOREIGN PATENT DOCUMENTS

EP         2560091 A2     2/2013
KR    20040053999 A       6/2004

(Continued)

OTHER PUBLICATIONS

International Search Report and Written Opinion—PCT/US2014/069454—ISA/EPO—Mar. 10, 2015 (134647WO).

*Primary Examiner* — Vincent Tran
(74) *Attorney, Agent, or Firm* — Smith Tempel

(57) ABSTRACT

Various embodiments of methods and systems for balancing user experience in a multimedia conferencing community are disclosed. An exemplary embodiment envisions a portable computing device ("PCD") receiving data indicative of one or more visual multimedia parameter settings in a companion PCD of the community. Based on the received data, the PCD may determine an adjustment to the settings of one or more of its own visual multimedia parameters such that a multimedia output in the form of a data packet stream is adjusted. In this way, the PCD may conserve power consumption by avoiding unnecessary multimedia workload processing for encoding a multimedia output that would not benefit the quality of service ("QoS") delivered by the companion PCD. Additionally, by optimizing the quality of the multimedia output in view of the companion device parameter settings, the PCD may allocate more of its power budget to improving its own QoS level.

30 Claims, 11 Drawing Sheets

(56) References Cited

U.S. PATENT DOCUMENTS

| | | | |
|---|---|---|---|
| 9,131,279 B2* | 9/2015 | Raveendran | H04N 21/816 |
| 2004/0023622 A1 | 2/2004 | Mantha et al. | |
| 2007/0135038 A1* | 6/2007 | Peele | H04N 21/43615 |
| | | | 455/7 |
| 2008/0268947 A1* | 10/2008 | Fyock | A63F 13/12 |
| | | | 463/29 |
| 2009/0270138 A1 | 10/2009 | Raveendran | |
| 2010/0328421 A1* | 12/2010 | Khot | H04N 7/15 |
| | | | 348/14.08 |
| 2012/0054664 A1* | 3/2012 | Dougall | H04N 21/23439 |
| | | | 715/772 |
| 2012/0195356 A1* | 8/2012 | Yi | H04N 19/119 |
| | | | 375/224 |
| 2012/0233644 A1* | 9/2012 | Rao | H04M 1/7253 |
| | | | 725/62 |
| 2013/0100228 A1 | 4/2013 | Tapia et al. | |
| 2014/0101253 A1* | 4/2014 | Bhogal | H04L 65/403 |
| | | | 709/204 |
| 2015/0326887 A1* | 11/2015 | Ducloux | H04N 19/176 |
| | | | 375/240.02 |

FOREIGN PATENT DOCUMENTS

| | | |
|---|---|---|
| WO | 2011138637 A1 | 11/2011 |
| WO | 2013085539 A1 | 6/2013 |

* cited by examiner

Exemplary Visual Multimedia Parameter Graphs

SYSTEM AND METHOD FOR BALANCED USER EXPERIENCE IN A MULTIMEDIA CONFERENCING COMMUNITY

DESCRIPTION OF THE RELATED ART

Portable computing devices ("PCDs") are becoming necessities for people on personal and professional levels. These devices may include cellular telephones, portable digital assistants ("PDAs"), portable game consoles, palmtop computers, and other portable electronic devices.

PCDs are typically limited in size and, therefore, room for components within a PCD often comes at a premium. As such, there rarely is enough space within a PCD for engineers and designers to mitigate thermal degradation or failure of processing components by using fans, clever spatial arrangements or strategic placement of passive cooling components. Therefore, current systems and methods rely on various temperature sensors embedded on the PCD chip and elsewhere to monitor the dissipation of thermal energy and then use the measurements to trigger application of thermal power management techniques that adjust workload allocations, processing speeds, etc. to reduce thermal energy generation.

For example, under a heavy graphics processing workload associated with a gaming application, current systems and methods throttle the voltage and frequency of a graphics processing unit ("GPU") to mitigate excessive thermal energy generation. In doing so, the graphics processing workload associated with the gaming application is not reduced but, rather, the speed at which the workload is processed is slowed. The inevitable result is that thermal energy generation is mitigated at the expense of the user experience ("Ux") as measured in user perceived quality of service ("QoS"). That is, throttling the GPU accomplishes the goal of reducing thermal energy generation by the GPU but causes the user experience to suffer due to a slowed graphics output. As such, current systems and methods for mitigating thermal energy generation by multimedia processing components in a PCD may unnecessarily impact the QoS provided to a user.

The impact on QoS may be even more severe under a use case that not only includes an active gaming application or other graphics-laden application, but also includes a multimedia video conferencing application in communication with a companion PCD. Current systems and methods employ a "one size fits all" throttling strategy without regard for the specific impact on a portion of an overall power budget in the PCD that is allocated to the video conferencing application. Additionally, current systems and methods adjust power consumption in a PCD running a video conferencing application in view of only the Ux related to that particular PCD.

Therefore, what is needed in the art is a system and method for intelligent multimedia-based thermal power management in a PCD. More specifically, what is needed in the art is a system and method that manages thermal energy generation in multimedia processing components by modifying the multimedia-based workload via selective adjustments of multimedia parameter settings. Additionally, what is needed in the art is a system and method that seeks to optimize Ux across a community of PCDs by making the selective adjustments of multimedia parameter settings in a particular PCD in view of multimedia parameter settings in one or more other PCDs in the community.

SUMMARY OF THE DISCLOSURE

Various embodiments of methods and systems for balancing user experience in a multimedia conferencing community using intelligent multimedia-based thermal power management in a portable computing device ("PCD") are disclosed. An exemplary embodiment of a method for balancing user experience in a multimedia conferencing community envisions a PCD receiving data indicative of one or more visual multimedia parameter settings in a companion PCD of the community. With the visual multimedia parameter settings of companion PCDs shared across the community, the thermal power management of the PCDs may be achieved in an interactive manner.

For example, based on the data received from the companion PCD, the PCD may determine an adjustment to the settings of one or more of its own visual multimedia parameters such that a multimedia output in the form of a data packet stream is adjusted. Also, the PCD may in turn cast its current multimedia parameters and the thermal power status to the companion PCD, so that it may receive a manageable multimedia input streamed from the companion PCD. In this way, the PCD may conserve power consumption by avoiding unnecessary multimedia workload processing for encoding and decoding a multimedia data that would not benefit the QoS delivered by the companion PCD. Additionally, by optimizing the quality of the multimedia output in view of the companion device parameter settings, the PCD may allocate more of its power budget to improving its own QoS level. Moreover, with PCDs in a multimedia conferencing community encoding and transmitting data streams that are optimized in view of parameter settings in companion PCDs of the community, an overall network bandwidth needed for a multimedia conferencing event may be minimized.

Once a PCD adjusts its own multimedia parameter settings in view of companion PCD settings and a power budget allocated to its multimedia conferencing application, it may monitor a condition associated with power consumption and compare it to a predefined threshold associated with the condition, such as a temperature threshold or power consumption budget. Based on the comparison of the condition to the predefined threshold, the method may determine that an adjustment to power consumption is warranted.

Determining an adjustment to power consumption triggers an adjustment in one or more visual multimedia parameters the settings of which contribute to power consumption associated with an overall multimedia workload. Data indicative of the active settings of a plurality of visual multimedia parameters is collected and performance graphs for each of the visual multimedia parameters are queried. The active setting of each visual multimedia parameter is then mapped to its respective graph such that a tangent with a slope is defined. The tangent slopes associated with each visual multimedia parameter are compared and, based on the comparison of tangent slopes, a first visual multimedia parameter is selected for its active setting to be adjusted. Advantageously, adjusting the active setting of the visual multimedia parameter operates to modify the overall multimedia workload such that power consumption in the PCD is adjusted accordingly. The adjusted settings may, in turn, be shared with companion PCDs in the networked multimedia community, whether in a peer to peer network or via a server monitoring the multimedia service.

Notably, the adjustment to power consumption may be a reduction in power consumption (for the purpose of reducing thermal energy generation) or an increase in power consumption (for the purpose of improving quality of service to a user), depending on the particular situation. In either scenario, the selection of visual multimedia parameters for setting adjustment is a function of the change in user experience versus the change in power consumption that will likely result from the setting adjustment. That is, in a scenario where an adjustment to power consumption comprises determining a reduction in power consumption, embodiments may select the visual multimedia parameter for which adjustment of the active setting will provide the least detrimental impact on user experience per unit reduction in power consumption. Similarly, in a scenario where an adjustment to power consumption comprises determining an increase in power consumption, embodiments may select the visual multimedia parameter for which adjustment of the active setting will provide the most positive impact on user experience per unit increase in power consumption.

Exemplary visual multimedia parameters for which settings may be adjusted by certain embodiments include, but are not limited to, color depth, display brightness, GPU processing resolution, image dynamics algorithm selection, resolution scaling ratios, frames per second processing rates, image/video filtering, and image/video compression methods that can control bit-rates.

BRIEF DESCRIPTION OF THE DRAWINGS

In the drawings, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral to encompass all parts having the same reference numeral in all figures.

DETAILED DESCRIPTION

Figure 1:
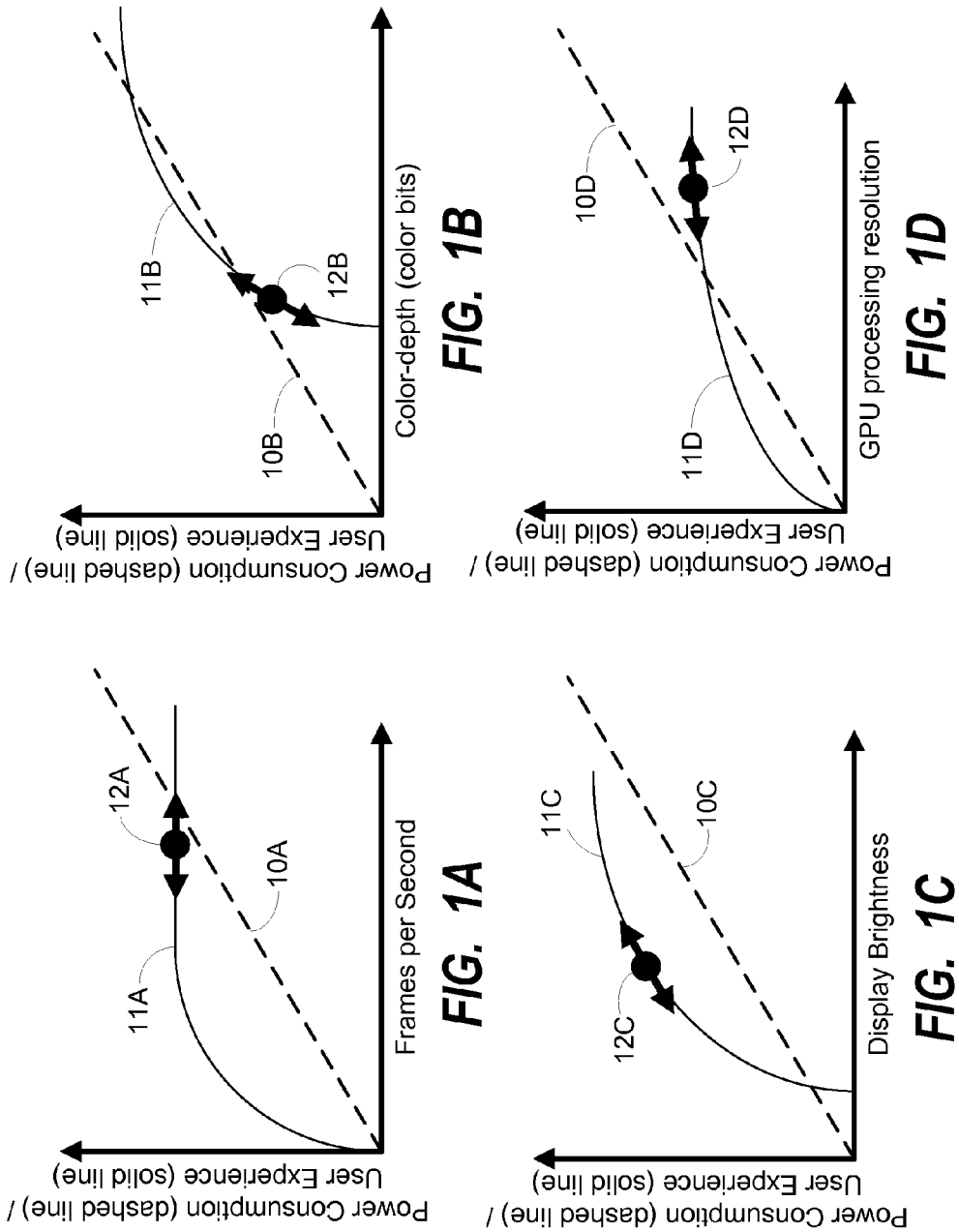
FIGS. 1A-1D are exemplary visual multimedia parameter graphs, each illustrating a relationship between a visual multimedia parameter setting, user experience relative to the setting and power consumption associated with the setting.

The word "exemplary" is used herein to mean "serving as an example, instance, or illustration." Any aspect described herein as "exemplary" is not necessarily to be construed as exclusive, preferred or advantageous over other aspects.

In this description, the term "application" may also include files having executable content, such as: object code, scripts, byte code, markup language files, and patches. In addition, an "application" referred to herein, may also include files that are not executable in nature, such as documents that may need to be opened or other data files that need to be accessed.

As used in this description, the terms "component," "database," "module," "system," "thermal energy generating component," "processing component," "multimedia processing component" and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component. One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

In this description, the terms "central processing unit ("CPU")," "digital signal processor ("DSP")," "graphical processing unit ("GPU")," and "chip" are used interchangeably. Moreover, a CPU, DSP, GPU or a chip may be comprised of one or more distinct processing components generally referred to herein as "core(s)." Additionally, to the extent that a CPU, DSP, GPU, chip or core is a functional component within a PCD that consumes various levels of power to operate at various levels of functional efficiency, one of ordinary skill in the art will recognize that the use of these terms does not limit the application of the disclosed embodiments, or their equivalents, to the context of processing components within a PCD.

In this description, it will be understood that the terms "thermal" and "thermal energy" may be used in association with a device or component capable of generating or dissipating energy that can be measured in units of "temperature." Consequently, it will further be understood that the term "temperature," with reference to some standard value, envisions any measurement that may be indicative of the relative warmth, or absence of heat, of a "thermal energy" generating device or component. For example, the "temperature" of two components is the same when the two components are in "thermal" equilibrium.

In this description, the terms "workload," "process load," "process workload," "multimedia workload" and the like are used interchangeably and generally directed toward the processing burden, or percentage of processing burden, associated with a given processing component in a given embodiment. Further to that which is defined above, a "graphical processing component" or "multimedia processing component" may be any component having one or more visual multimedia parameters with which it is associated that operate to define a multimedia workload. To this end, a graphical processing component may include, but is not limited to including, a graphical processing unit, a display controller, a display, a video/photo encoder, an image sensor processor for front/rear cameras, a core, a main core, a sub-core, a processing area, a hardware engine, etc. or any component residing within, or external to, an integrated circuit within a portable computing device and configured to process a multimedia workload.

In this description, the terms "thermal mitigation technique(s)," "thermal policies," "thermal power management," "thermal mitigation measure(s)," "throttling" and the like are used interchangeably. Notably, one of ordinary skill in the art will recognize that, depending on the particular context of use, any of the terms listed in this paragraph may serve to describe hardware and/or software operable to increase performance at the expense of thermal energy generation, decrease thermal energy generation at the expense of performance, or alternate between such goals.

In this description, the term "portable computing device" ("PCD") is used to describe any device operating on a limited capacity power supply, such as a battery. Although battery operated PCDs have been in use for decades, technological advances in rechargeable batteries coupled with the advent of third generation ("3G") and fourth generation ("4G") wireless technology have enabled numerous PCDs with multiple capabilities. Therefore, a PCD may be a cellular telephone, a satellite telephone, a pager, a PDA, a smartphone, a navigation device, a smartbook or reader, a media player, a combination of the aforementioned devices, a laptop computer with a wireless connection, among others.

In this description, the term "community" refers to a network of two or more PCDs that are communicatively coupled. By way of example, and not limitation, a community of PCDs may comprise a pair or more of PCDs engaged in a multimedia video conferencing event wherein video and/or audio data packets are transmitted by and between the pair of PCDs. Each PCD in the community may render multimedia via the decoding of data packets encoded and transmitted by another PCD in the community. Moreover, a community of PCDs may exchange side band communications in addition to the multimedia data packets.

In this description, the terms "companion," "companion PCD," "companion community member" and the like are meant to refer to one or more other PCDs comprised within a community a PCDs. For instance, multimedia data packets encoded by one PCD in a community may be transmitted to one or more other PCDs in the community, i.e. the multimedia data packets may be transmitted from one PCD in the community to one or more companion PCDs.

In this description, embodiments of the systems and methods are described within the context of a community of PCDs commonly engaged in a multimedia conference event such as a video conference. It is envisioned that one or more of the PCDs engaged in the video conference may be operated per a use case that includes running other applications simultaneously with a video conferencing application. Notably, one of ordinary skill in the art will understand that the examples offered in this description are used for illustrative purposes only and are not meant to suggest that embodiments of the systems and methods are limited to use cases that include multimedia conferencing applications.

Managing thermal energy generation in a PCD or across a community of PCDs engaged in a multimedia video conferencing event, without unnecessarily impacting quality of service ("QoS") at any given PCD within the community, can be accomplished by sharing performance settings of visual multimedia parameters among the PCDs. Based on the visual multimedia parameter settings of other PCDs in a community of PCDs, a given PCD may optimize its codec settings so that the QoS delivered to its user is optimized within a power budget allocation.

Each PCD in a community may monitor its own power budget and/or one or more sensor measurements that correlate with the temperatures of silicon junctions in core(s), package on package ("PoP") memory components, and/or the outer shell, i.e. "skin," of the PCD. By closely monitoring the power budget and/or temperatures associated with components, an intelligent multimedia thermal policy manager ("IM-TPM") module in the PCD may systematically and individually adjust performance settings of visual multimedia parameters in an effort to mitigate thermal energy generation and optimize user experience. Advantageously, by selectively adjusting visual multimedia parameter settings as a function of user experience, intelligent multimedia thermal power management systems and methods can optimize QoS under any multimedia workload. The visual multimedia parameter settings determined by the IM-TPM module of a given PCD may be shared across the community so that other PCDs can adjust their parameter settings in view of the needs or capabilities of their companion community members. In this way, an overall user experience or QoS for the community may be optimized.

Notably, although exemplary embodiments of methods for a balanced user experience in a multimedia conferencing community are described herein in the context of multimedia conferencing applications using graphical processing components in the form of a graphical processing unit ("GPU"), a display controller, a display, a video/photo encoder, and an image sensor processor for front/rear cameras, application of the methodologies are not limited to such graphical processing components or use cases. It is envisioned that embodiments of methods for a balanced user experience in a multimedia conferencing community may be extended to any community of PCDs that rely on components to process a workload that is adjustable based on one or more parameter settings such as, but not limited to, a modem processor, a camera, etc.

FIGS. 1A-1D are exemplary visual multimedia parameter graphs, each illustrating performance curves that define a relationship between a visual multimedia parameter setting and user experience relative to the setting and power consumption associated with the setting. Referring to FIG. 1A, moving left to right along the x-axis of the graph represents an increase in the number of frames per second ("FPS") at which a multimedia workload may be processed and rendered by a given PCD. As one of ordinary skill in the art will recognize, an increase in the FPS rate requires an increase in the power consumed (which also correlates to an increase in thermal energy generation) by the multimedia processing component associated with the FPS rate (such as a GPU). Accordingly, moving upward along the y-axis represents an increase in power consumption and the dashed line 10A represents the correlation between FPS rate and power consumption, as is understood by one of ordinary skill in the art.

In the FIG. 1A graph, the y-axis may also represent a user experience ("Ux") level where moving upward along the y-axis correlates with an improved Ux. Accordingly, as represented by the solid line curve 11A, there is a correlation between the FPS level and the Ux level. Referring to the curve 11A, the initially steep slope of the curve 11A illustrates that an increase in the FPS level from a relatively low level may produce a significant increase in Ux. By contrast, the flatter portion of the slope 11A which corresponds to higher FPS levels illustrates that further increases in FPS levels will not produce noticeable increases in Ux levels once the FPS level is already relatively high.

With the above in mind, one of ordinary skill in the art will recognize that an increase or decrease in the FPS level, when the FPS level is initially relatively low, will generate a larger impact on Ux per watt of power consumption than when the initial FPS level is initially relatively high. For example, the point 12A represents an exemplary initial FPS level that is relatively high, i.e. the multimedia processing component associated with the FPS visual multimedia parameter is processing a multimedia workload at a high processing speed. As such, the slope of a tangent to curve 11A at point 12A is relatively flat and indicates that an adjustment down in the FPS level will generate power savings (thus lowering thermal energy generation) without significant impact to Ux. Similarly, an adjustment up in the FPS level will require increased power consumption (thus increased thermal energy generation) without a positive impact on Ux.

As one of ordinary skill in the art will understand, the FPS visual multimedia parameter affects the speed at which a multimedia workload is processed. One or more other visual multimedia parameters, however, such as, but not limited to, color depth, display brightness, GPU processing resolution, image dynamics, compression ratio, and resolution scaling ratio may cooperate to determine an aggregate multimedia workload that must be processed by one or more multimedia processing components or determine a power consumption level required to render a multimedia output. Advantageously, therefore, adjustment of one or more of the visual multimedia parameters may either reduce the multimedia workload such that less power consumption is required to process the workload or may save in power consumption required to render an output of a multimedia workload.

Notably, the aggregate multimedia workload as determined by the various visual multimedia parameter settings must be processed subject to a power budget allocation. As such, it is envisioned that the various parameter settings may be dynamically adjusted such that the QoS delivered to the user is optimized within the power budget constraints. Advantageously, embodiments of the systems and methods may share the parameter settings of PCDs across a community of PCDs so that power is not wasted by encoding and transmitting multimedia data packets that exceed the parameter settings on a receiving PCD in the community.

Referring to FIG. 1B, moving left to right along the x-axis of the graph represents an increase in the color depth ("color bits") at which a multimedia output may be rendered. As one of ordinary skill in the art will recognize, an increase in the color depth level requires an increase in the power consumed (which also correlates to an increase in thermal energy generation) by the multimedia processing component associated with the color depth parameter (such as a GPU). That is, the higher the color depth parameter setting, the higher the workload that must be processed in order to render a graphical output. Accordingly, moving upward along the y-axis represents an increase in power consumption and the dashed line 10B represents the correlation between color depth level and power consumption, as is understood by one of ordinary skill in the art.

In the FIG. 1B graph, the y-axis may also represent a Ux level where moving upward along the y-axis correlates with an improved Ux. Accordingly, as represented by the solid line curve 11B, there is a correlation between the color depth level and the Ux level. Referring to the curve 11B, the initially steep slope of the curve 11B illustrates that an increase in the color depth level from a relatively low level may produce a significant increase in Ux. By contrast, the upper portion of the slope 11B which corresponds to higher color depth levels illustrates that further increases in color depth levels will not produce noticeable increases in Ux levels once the color depth level is already relatively high. That is, the user may not notice or appreciate the increased color depth level and, as such, an increase will not improve Ux.

With the above in mind, one of ordinary skill in the art will recognize that an increase or decrease in the color depth level, when the color depth level is initially relatively low, will generate a larger impact on Ux per watt of power consumption than when the initial color depth level is initially relatively high. For example, the point 12B represents an exemplary initial color depth level that is relatively low, i.e. the multimedia processing component associated with the color depth visual multimedia parameter is processing a multimedia workload associated with a relatively low color depth setting. As such, the slope of a tangent to curve 11B at point 12B is relatively steep and indicates that an adjustment down in the color depth setting will generate little power savings (thus saving little thermal energy generation) while significantly impacting Ux detrimentally. Similarly, an adjustment up in the color depth setting will require only a small increase in power consumption (thus a small increase in thermal energy generation) while providing a significant and positive impact on Ux.

Referring to FIG. 1C, moving left to right along the x-axis of the graph represents an increase in the display brightness with which a multimedia output may be rendered. As one of ordinary skill in the art will recognize, an increase in the display brightness setting requires an increase in the power consumed (which also correlates to an increase in thermal energy generation) by the multimedia processing component associated with the display brightness parameter (such as a display screen). That is, the higher the display brightness parameter setting, the higher the power level required in order to render a graphical output. Accordingly, moving upward along the y-axis represents an increase in power consumption and the dashed line 10C represents the correlation between display brightness and power consumption, as is understood by one of ordinary skill in the art.

In the FIG. 1C graph, the y-axis may also represent a Ux level where moving upward along the y-axis correlates with an improved Ux. Accordingly, as represented by the solid line curve 11C, there is a correlation between the display brightness setting and the Ux level. For the most part, as one of ordinary skill in the art will recognize, a brighter display setting is favorable to a user over a dim display setting. Referring to the curve 11C, the initially steep slope of the curve 11C illustrates that an increase in the display brightness from a relatively low level may produce a significant increase in Ux. By contrast, the upper portion of the slope 11C which corresponds to higher display brightness illustrates that further increases in display brightness will not produce noticeable increases in Ux levels once the display brightness setting is already relatively high. That is, the user may not notice or appreciate the increased display brightness level and, as such, an increase in display brightness will not improve Ux.

With the above in mind, one of ordinary skill in the art will recognize that an increase or decrease in the display brightness, when the display brightness setting is initially relatively low, will generate a larger impact on Ux per watt of power consumption than when the initial display brightness setting is initially relatively high. For example, the point 12C represents an exemplary initial display brightness setting that is neither high nor low, i.e. the multimedia processing component associated with the display brightness visual multimedia parameter is rendering a multimedia output associated with a moderate display brightness setting. As such, the slope of a tangent to curve 11C at point 12C indicates that an adjustment down in the display brightness setting will generate moderate power savings (thus saving moderate amounts of thermal energy generation) while moderately impacting Ux. Similarly, an adjustment up in the display brightness setting will require a moderate increase in power consumption (thus a moderate increase in thermal energy generation) while providing a positive though moderate impact on Ux.

Referring to FIG. 1D, moving left to right along the x-axis of the graph represents an increase in the GPU processing resolution at which a multimedia workload may be processed and rendered. As one of ordinary skill in the art will recognize, an increase in the GPU processing resolution setting requires an increase in the power consumed (which also correlates to an increase in thermal energy generation) by the multimedia processing component associated with the GPU processing resolution setting (such as a GPU). Accordingly, moving upward along the y-axis represents an increase in power consumption and the dashed line 10D represents the correlation between GPU processing resolution and power consumption, as is understood by one of ordinary skill in the art.

In the FIG. 1D graph, the y-axis may also represent a user experience ("Ux") level where moving upward along the y-axis correlates with an improved Ux. Accordingly, as represented by the solid line curve 11D, there is a correlation between the GPU processing resolution setting and the Ux level. Referring to the curve 11D, the initially steep slope of the curve 11D illustrates that an increase in the GPU processing resolution from a very low setting may produce a significant increase in Ux. By contrast, the flatter portion of the slope 11D which corresponds to moderate and high GPU processing resolution settings illustrates that further increases in GPU processing resolution beyond relatively low levels will not produce noticeable increases in Ux levels.

With the above in mind, one of ordinary skill in the art will recognize that an increase or decrease in the GPU processing resolution setting, when the GPU processing resolution setting is initially very low, will generate a more appreciable impact on Ux per watt of power consumption than when the initial GPU processing resolution setting is initially relatively moderate or even high. For example, the point 12D represents an exemplary initial GPU processing resolution setting that is relatively high, i.e. the multimedia processing component associated with the GPU processing resolution visual multimedia parameter is processing a multimedia workload at a high resolution level. As such, the slope of a tangent to curve 11D at point 12D is relatively flat and indicates that an adjustment down in the GPU processing resolution setting will generate power savings (thus lowering thermal energy generation) without significant impact to Ux. Similarly, an adjustment up in the GPU processing resolution setting will require increased power consumption (thus increased thermal energy generation) with no noticeable impact on Ux.

Based on a weighted sum calculation of Ux from visual multimedia parameter settings, embodiments of the system and method may systematically adjust one or more parameter settings in a PCD to optimize Ux while adjusting overall power consumption to meet a power budget allocation. As a non-limiting example, visual multimedia parameters monitored by a certain embodiment may include FPS rate, GPU processing resolution setting, color depth setting (color bits used to render graphics), display brightness level, motion estimation algorithm selection and a 3-D image algorithm selection. As the PCD is in operation, the settings and levels of the various parameters collectively contribute to an overall Ux level and an overall power consumption level associated with multimedia processing. As explained above, an increase or decrease in the active setting for any one of the parameters may affect both overall Ux and overall power consumption in the PCD. Advantageously, in the event that power consumption should be increased or decreased, embodiments seek to make such power consumption adjustments (and, by extension, thermal energy generation adjustments) in a manner that optimizes Ux. In one example, a cost may be defined as Y+lambda×X, where Y, lambda, X, respectively, denote the amount of the user experience, the slope, and any control parameters that can be placed in x-axis as shown in FIG. 1A-1D. Given the costs, the adjusted parameters are obtained by finding the lowest cost.

As the settings and levels of the various parameters are adjusted within a given PCD to optimize Ux within a power budget allocation for multimedia workload processing, certain embodiments of the systems and methods utilize side band communications with other PCDs in a networked community to share the settings. In this way, the other PCD(s) in the community may adjust their own power consumption such that they are not consuming power for the purpose of encoding and transmitting multimedia data that, because of multimedia parameter settings in a receiving PCD, will not produce a worthwhile impact in Ux. In this way, the overall Ux across the community may be optimized in view of overall power consumption. More detail regarding embodiments of the systems and methods that share multimedia parameter settings across a community of PCDs is described below relative to at least FIGS. 3-4

Figure 2:
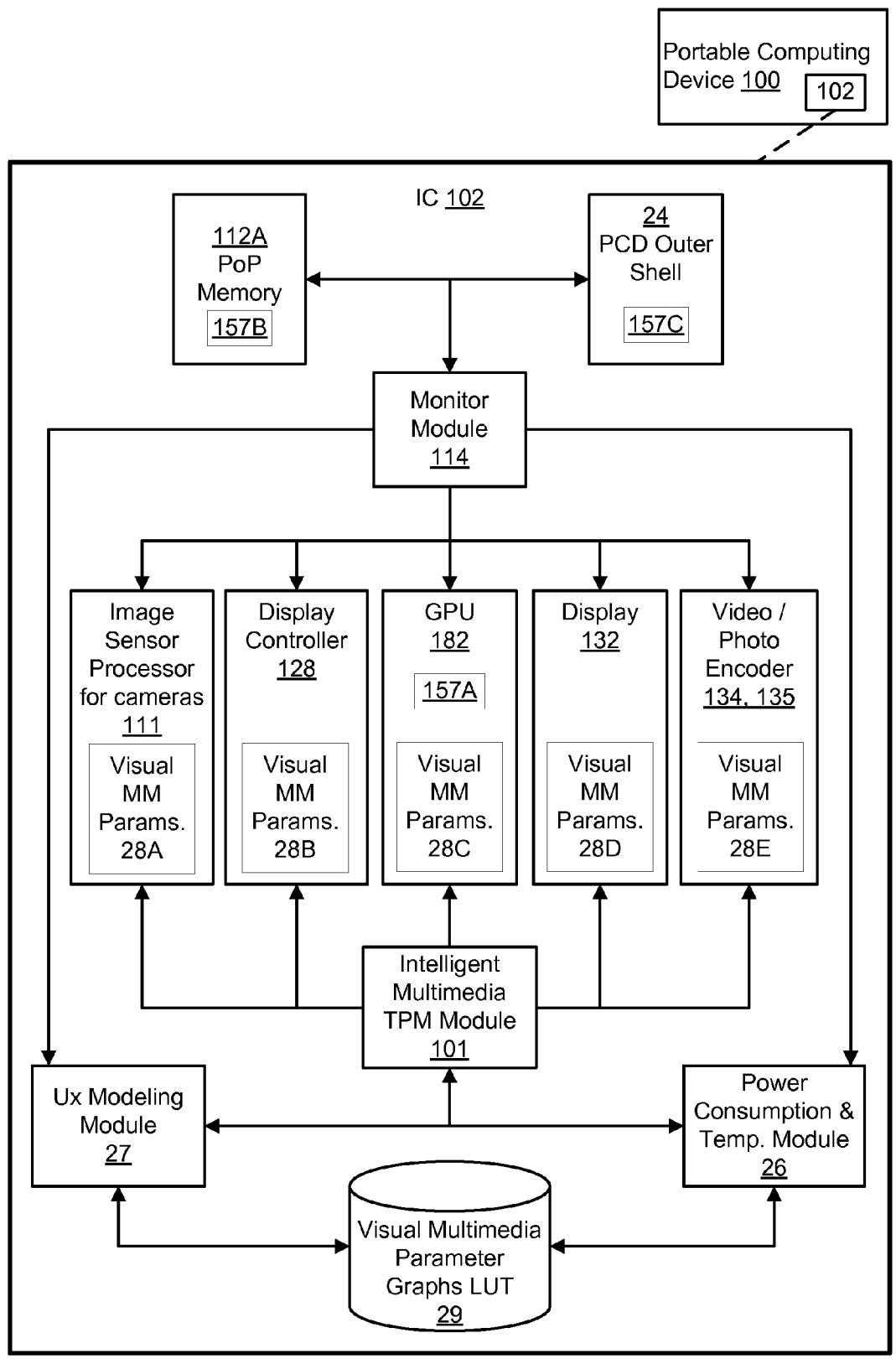
FIG. 2 is a functional block diagram illustrating an embodiment of an on-chip system for implementing intelligent multimedia-based thermal power management in a portable computing device ("PCD") through selective adjustment of one or more visual multimedia parameters.

FIG. 2 is a functional block diagram illustrating an embodiment of an on-chip system 102 for implementing intelligent multimedia-based thermal power management in a portable computing device ("PCD") 100 through selective adjustment of one or more visual multimedia parameters 28. Advantageously, by selectively adjusting one or more visual multimedia parameters 28 associated with multimedia workload and/or multimedia output, embodiments of the systems and methods may address thermal energy mitigation needs and/or power budget limits without overly impacting the overall user experience ("Ux").

In general, the system employs three main modules which, in some embodiments, may be contained in one or two modules: (1) a power consumption and temperature ("PCT") module 26 for analyzing temperature readings, power budget allocations and visual multimedia parameter 28 settings monitored by a monitor module 114 (notably, monitor module 114 and PCT module 26 may be one and the same in some embodiments) and determining thermal power management actions; (2) a User Experience ("Ux") modeling module 27 for selecting visual multimedia parameter adjustments according to thermal power management actions received from PCT module 26; and (3) an Intelligent Multimedia Thermal Power Management ("IM-TPM") module 101 for adjusting visual multimedia parameter 28 settings according to instructions received from Ux modeling module 27. Advantageously, embodiments of the system and method that include the three main modules optimize the overall Ux with multimedia processing and output while maintaining power consumption of multimedia processing components within a predetermined power budget and/or temperature levels beneath acceptable thresholds.

Notably, the IM-TPM module 101 may also adjust codec settings for encoding and decoding multimedia data packets transmitted to and from the PCD 100 in a community multimedia event, such as a video conference. Moreover, the IM-TPM module 101 may share its visual multimedia parameter 28 settings with companion PCDs in a community. More detail regarding such functionality in the IM-TPM module 101 is described below relative to at least FIG. 3.

Returning to the exemplary embodiment of FIG. 2, monitor module 114 monitors various visual multimedia parameter 28 settings and levels associated with multimedia processing components display controller 128, GPU 182, display 132, video/photo encoder 134,135 and image sensor processor for front/rear cameras 111. Also, the monitor module 114 may monitor temperature sensors 157 associated with various components or aspects of the PCD 100 including, but not limited to, silicon junctions in core(s) of GPU 182, package on package ("PoP") memory components 112A, and/or the outer shell 24, i.e. "skin," of the PCD 100. The monitor module 114 may relay data indicative of the active settings of the visual multimedia parameters 28 and/or the temperatures measured by the sensors 157 to the PCT module 26.

From the data provided by the monitor module 114, the PCT module 26 may recognize that a thermal temperature threshold has been exceeded and determine that thermal energy generation associated with multimedia processing components should be mitigated. Similarly, from the data provided by the monitor module 114 regarding active settings of visual multimedia parameters 28, the PCT module 26 may calculate an overall power consumption level of the multimedia processing components 111, 128, 182, 132, 134, 135 and compare it to a predetermined power budget. To calculate the overall power consumption level from the active settings of the visual multimedia parameters 28, the PCT module 26 may query the visual multimedia parameter graph lookup table ("LUT") 29 which contains visual multimedia parameter graphs such as those depicted in FIG. 1. Advantageously, for each active setting monitored by the monitor module 114, the PCT module 26 may map a point 12 on a curve 11 in the appropriate visual multimedia parameter graph and, based on the x-axis value of the point 12, determine a power consumption level associated with the active setting of the visual multimedia parameter. Subsequently, an aggregate power consumption level associated with all the visual multimedia parameter settings may be calculated by the PCT module 26 and compared to a predefined power budget.

If a temperature threshold or a power budget has been exceeded, then the PCT module 26 may instruct the Ux modeling module 27 to determine appropriate adjustments to one or more of the active settings of the visual multimedia parameters 28. Similarly, if the PCT module 26 determines that there is available headroom in the power budget, i.e. that user experience may be improved by an increase in power consumption that will not cause the power budget to be exceeded, then the PCT module 26 may instruct the Ux modeling module 27 to determine appropriate adjustments to one or more of the active settings of the visual multimedia parameters 28.

The Ux modeling module 27, upon receiving instructions from the PCT module 26 to adjust one or more visual multimedia parameter 28 settings either up or down, queries LUT 29 and compares visual multimedia parameter graphs associated with parameters 28 that are eligible for adjustment. Having also received the active settings of the visual multimedia parameters 28 from the monitor module 114, the Ux modeling module 27 maps a point 12 on a curve 11 in the appropriate visual multimedia parameter graph for each active setting. Based on the slope of the tangent for each point 12, the Ux modeling module 27 may determine which parameter(s) 28 should be adjusted in order to optimize the user experience within the power consumption constraints dictated by the PCT module 26.

For instance, if the PCT module 26 has instructed that thermal energy generation should be mitigated by reducing power consumption, the Ux modeling module 27 may identify those tangents having slopes that are relatively flat and subsequently select the associated parameters for adjustment. In this way, the detrimental impact on user experience may be kept at a minimum per unit of power saved as a result of an adjustment. Similarly, if the PCT module 26 has instructed that power consumption may be increased without exceeding a power budget, the Ux modeling module 27 may identify those tangents having slopes that are relatively steep and subsequently select the associated parameters for adjustment. In this way, the impact on user experience may be maximized per additional unit of power consumed as a result of an adjustment.

Notably, it is envisioned that some embodiments of the system and method may identify the single parameter 28 having the most favorable tangent slope and then adjust the setting of the parameter 28 only as much as is necessary to capture the targeted power savings or consumption increase. Other embodiments may adjust a first parameter setting only up to the point that the adjusted setting defines a tangent having a slope that is less favorable than the slope of a tangent associated with a second parameter 28, at which point the setting of the second parameter is adjusted accordingly. Still other embodiments, instead of making a setting adjustment and gathering feedback from the monitor module 114 before determining a second setting adjustment, may calculate a plurality of adjustments across multiple parameters 28 and then make all adjustments at the same time.

Returning to the FIG. 2 embodiment, the Ux modeling module 27 may instruct the IM-TPM module 101 to make certain adjustments in the settings associated with one or more of the visual multimedia parameters 28. Notably, as explained above, the visual multimedia parameters 28 may be associated with any power consuming component, aspect or function of the PCD 100 that affects multimedia processing or output. In the exemplary embodiment of FIG. 2, five multimedia processing components are illustrated in the form of a display controller 128, a GPU 182, a display 132, a video/photo encoder 134,135, and an image sensor processor for front/rear cameras 111.

Exemplary visual multimedia parameters 28A may include, but are not limited to, image resolution settings, frames per second ("FPS") rates, image noise reduction levels, anti-shake image stabilization availability, color/contrast adjustment availability and image enhancement filter settings.

Exemplary visual multimedia parameters 28B may include, but are not limited to, a resolution scaling ratio (original to display), the adjustment of which may directly affect power consumption by the display controller 128 and corresponding user experience and FPS rate for multi-image layer composition.

Exemplary visual multimedia parameters 28C may include, but are not limited to, various image dynamic algorithms, FPS rates, GPU processing resolution setting, and color depth bits settings, the adjustments of which may directly affect power consumption by the GPU 182 and corresponding user experience.

Exemplary visual multimedia parameters 28D may include, but are not limited to, display brightness setting, the adjustment of which may directly affect power consumption by the display and corresponding user experience.

Exemplary visual multimedia parameters 28E may include, but are not limited to, video encoding compression ratio settings, video recording resolution settings, FPS rates of video recording, FPS of burst photo shots (shutter interval settings) and encoding processing speed (latency settings) per photo.

Other exemplary parameters 28 associated with the exemplary multimedia sub-systems 111, 128, 182, 132, 134, 135 include, but are not limited to:

| Sub-system | Exemplary Visual Multimedia Parameters 28 |
|---|---|
| GPU 182 | GPU processing resolution (Graphics processing resolution) |
| | Color-depth (color bits) |
| | Frames per second for 3D/2D graphics processing |
| | Various image enhancement filters (on/off) |
| | Frame per second for multi-image layer composition |
| Display Controller 128 | Resolution scaling (original to display) |
| | Frame per second for multi-image layer composition |
| Display device 132 | Display brightness |
| Video/Photo encoder 134, 135 | Video encoding compression ratio |
| | Video recording resolution |
| | Frames per second of video recording |
| | Frames per second of burst photo shots (shutter intervals) |
| | Encoding processing speed (latency) per photo |
| Image sensor processor for the front/rear cameras 111 | Image resolution |
| | Frames per second |
| | Image noise reduction level |
| | Anti-shake image stabilization (on/off) |
| | Color/contrast adjustment (on/off) |
| | Various image enhancement filters (on/off) |

Figure 3A:
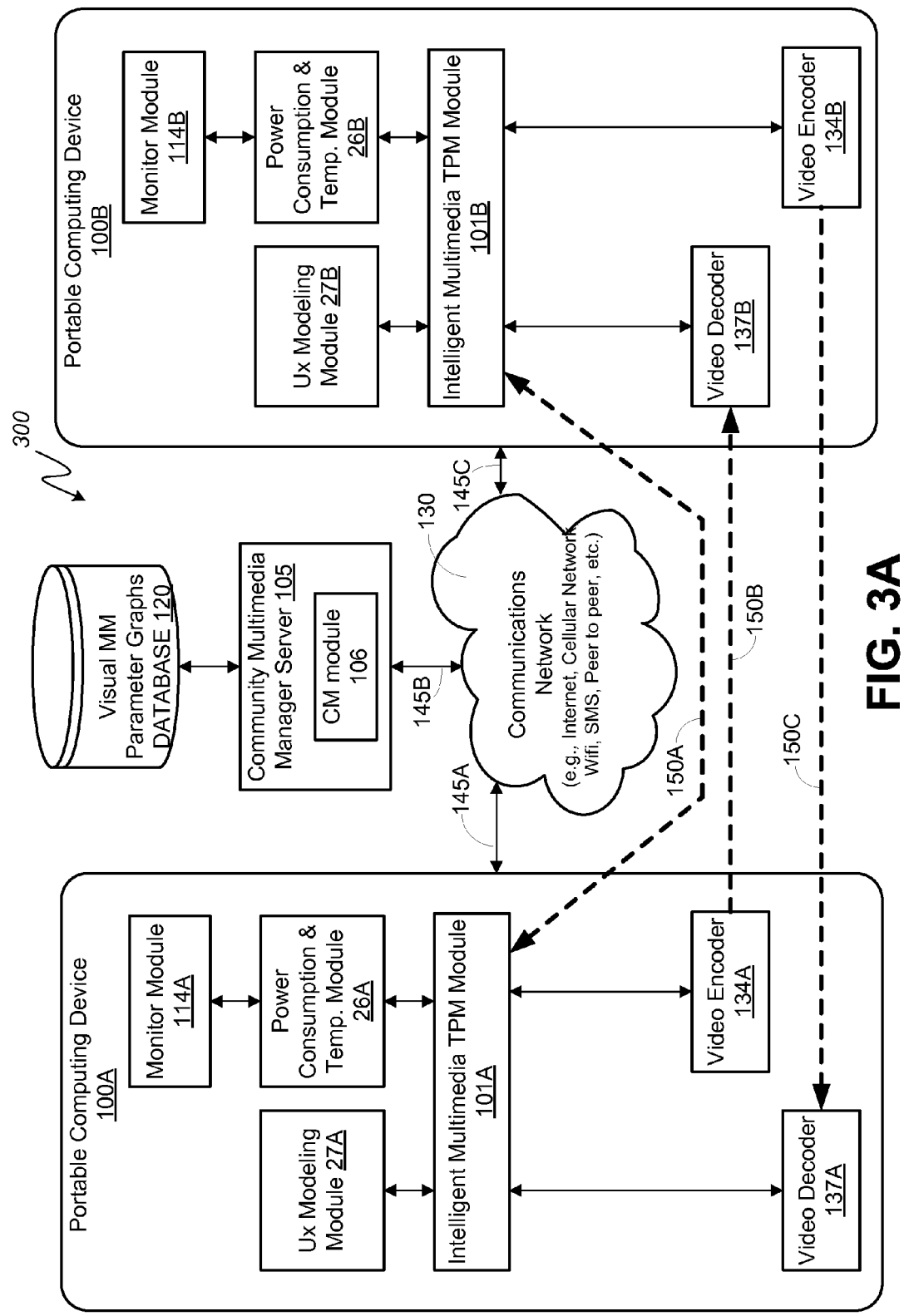
FIGS. 3A-3B are functional block diagrams illustrating embodiments of a system for generating a balanced user experience ("Ux") across a multimedia conferencing community.
Figure 3B:
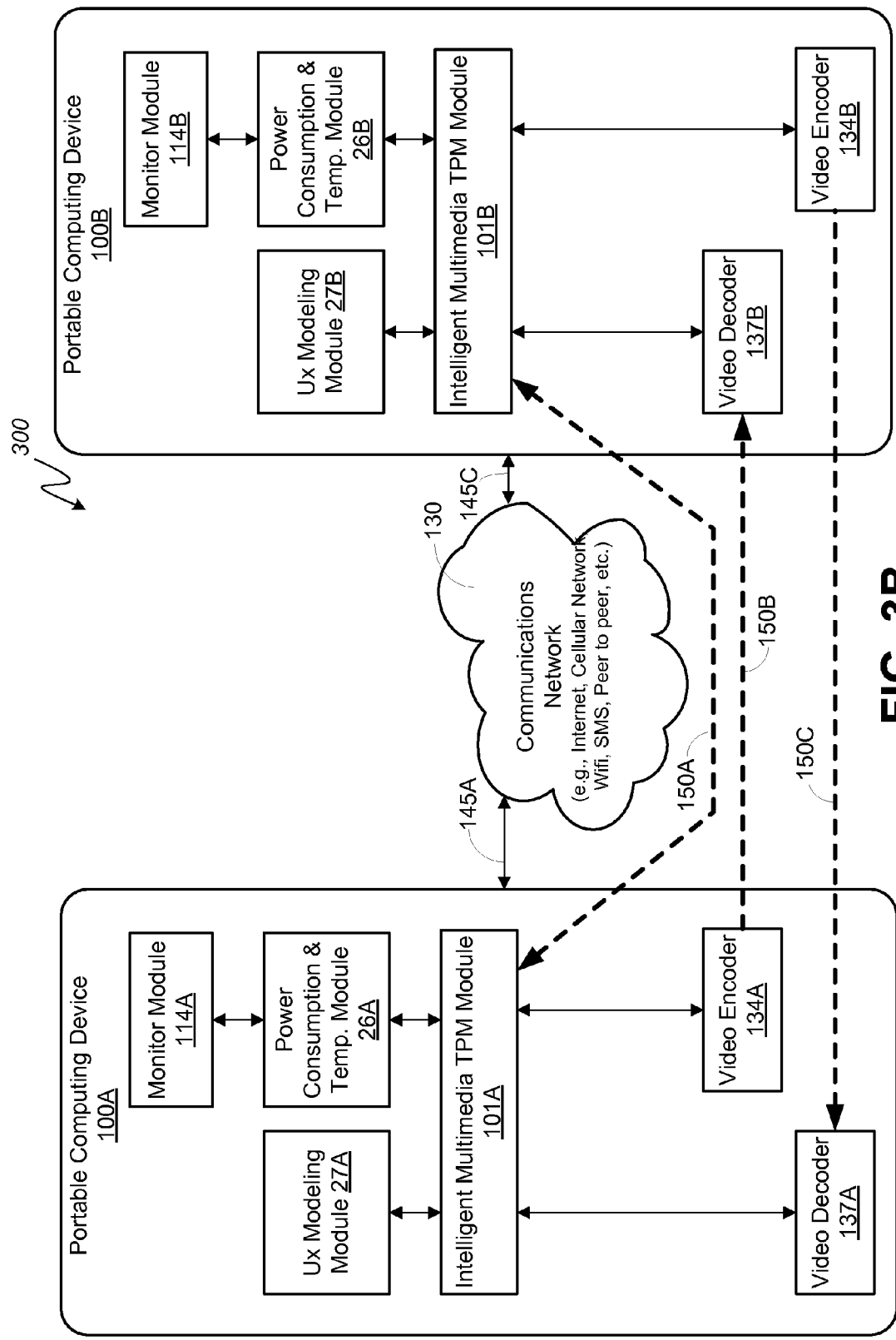

FIGS. 3A-3B are functional block diagrams illustrating embodiments of a system 300 for generating a balanced user experience ("Ux") across a multimedia conferencing community. In the FIG. 3A embodiment, various aspects are administered by the CMM server 105 whereas, in the FIG. 3B embodiment, those aspects are administered by one or more PCDs 100 in a peer to peer arrangement. The FIG. 3 embodiments will be described together, although it is envisioned that variations of either arrangement may be employed for providing a balanced Ux across a multimedia conferencing community. The illustrative community of system 300 is depicted as including a pair of companion PCDs 100A, 100B although it is envisioned that any number of PCDs may be included in a system 300. As described above relative to FIGS. 1 and 2, each PCD 100 may selectively adjust one or more visual multimedia parameters in an effort to optimize Ux within a predetermined power budget.

For the purpose of describing the system 300 embodiment, consider an exemplary use case scenario where each PCD 100A, 100B is actively engaged in use cases that include multiple applications with graphic workloads, with one application being a community-based multimedia conferencing application. As would be understood by one of ordinary skill in the art, the multimedia conferencing applications running simultaneously on each PCD 100A, 100B in the system 300 may enable the users of the respective PCDs 100 to participate in a multimedia conferencing event. As would be further understood by one of ordinary skill in the art, participation in the conferencing event may dictate that video and/or audio data captured by one PCD (e.g., PCD 100A) may be transmitted to, decoded and rendered by, a companion PCD (e.g., PCD 100B) in the system 300 via a communications network 130, and vice versa.

The video and/or audio data may be captured by a microphone 160 and/or a camera 148 in one PCD 100 (see FIG. 5), transmitted via communication links 145 of network 130 to a companion PCD 100 in the system 300, and rendered by the companion PCD 100 through speakers 154, 156 and/or display 132. As described above, the video data may be rendered per various visual multimedia parameter settings determined by the on-chip system 102 of FIG. 2.

Returning to the exemplary scenario, suppose that PCD 100A is operating per a use case that includes a graphics-heavy gaming application and the multimedia conferencing application. PCD 100B may also be operating per a use case with multiple graphics-dependent applications such as a web-based presentation via an Internet browser and the multimedia conferencing application. In each PCD 100, it is envisioned that an overall power budget may be sub-divided such that only a portion of the power budget is allocated to the multimedia conferencing application. Notably, and as would be understood by one of ordinary skill in the art, the power budget portions allocated to the multimedia conferencing application may differ among the PCDs 100 and, further, the multimedia performance capabilities may also differ.

In the exemplary scenario, the on-chip systems 102 of the PCDs 100 may sacrifice QoS associated with one application in favor of an increased QoS associated with another application. For example, in PCD 100A its on-chip system 102 may allocate a portion of the overall power budget to the multimedia conferencing application based on a goal of optimizing the QoS associated with the gaming application. Similarly, in PCD 100B its on-chip system 102 may allocate a portion of the overall power budget to the web-based presentation based on a goal of optimizing the QoS associated with the multimedia conferencing application. The IM-TPM module(s) 101 may determine and/or recognize how an overall power budget in a given PCD 100 is distributed among active applications of a use case.

With the above in mind, the system 300 may be described initially from the perspective of PCD 100A. As previously described, the monitor module 114A may monitor temperature sensors 157 and/or other indicators of power consumption within PCD 100A. The PCT module 26A may be responsible for determining the portion of an overall power budget that is allocated to the multimedia conferencing application. Based on the allocated portion of the power budget, the PCT module 26A works with the Ux Modeling module 27A to set the various multimedia parameters such that the QoS associated with the multimedia conferencing event is optimized for the user. The IM-TPM module 101A may set the parameters and then share them with PCD 100B via network 130.

PCDs 100 may be coupled to the network 130 by various types of communication links 145. These communication links 145 may comprise wired as well as wireless links. The communication links 145 allow a PCD 100 to establish virtual links 150 with each other. While a virtual link 150 is depicted between PCDs 100A and 100B, an actual wired or wireless link may exist directly between the PCDs 100 to establish bi-directional communications as understood by one of ordinary skill in the art.

Returning to the example, IM-TPM module 101A may establish side band communications via link 150A with IM-TPM module 101B in companion PCD 100B. Advantageously, PCD 100B may then set its multimedia encoding parameters in view of the settings at PCD 100A. For example, referring back to FIG. 1B, suppose that IM-TPM module 101A has set the color-depth parameter to point 12B and subsequently shared the setting with IM-TPM module 101B of PCD 100B. IM-TPM module 101B may then restrict its video data encoding with regards to color-depth such that it does not exceed the point 12B setting. In doing so, the IM-TPM module 101B may avoid unnecessary power consumption on its end of the video conference that would otherwise occur if it was encoding video data packets not needed by the PCD 100A device.

Notably, by sharing multimedia parameter settings across communications link 150A, the PCDs 100 may minimize the power consumption of encoders 134 as only the video data required by decoders 137 is transmitted across virtual links 150B, 150C. In this way, power consumption associated with a multimedia conferencing application may be optimized at each PCD 100 and Ux balanced across the multimedia conferencing community.

Referring back to the FIG. 3 illustration, it is envisioned that certain embodiments may employ a community multimedia manager ("CMM") server 105. In such an embodiment, the CMM server 105 may include a CMM module 106 for performing all or some of the functions previously described relative to PCT modules 26, Ux Modeling modules 27 and IM-TPM modules 101. The CMM server 105 may access a visual multimedia parameter graphs database 120 for the purpose of determining appropriate parameter settings for one or more of PCDs 100. The settings may then be communicated back to the PCDs 100 for application by the IM-TPM module 101. The settings may also be shared with other IM-TPM modules of companion PCDs 100 in the system 300. In this way, the CMM server 105 may be a central device for employing embodiments of the systems and methods for balancing Ux across a community in a multimedia conferencing event.

For embodiments of the systems and methods that include the CMM server 105, the PCDs 100 may communicate with the CMM server 105 via network 130. When the CMM server 105 is coupled to the network 130, the server 105 may communicate through the network 130 with various different PCDs 100 in the community that are participating in a multimedia conferencing event. Each PCD 100 may run or execute web browsing software or functionality to access the CMM server 105 and its various applications including CMM module 106. Any device that may access the network 130 either directly or via a tether to a complimentary device, may be a PCD 100 according to the system 300. The PCDs 100, as well as other components within system 100 such as, but not limited to, a wireless router (not shown), may be coupled to the network 130 by various types of communication links 145. These communication links 145 may comprise wired as well as wireless links. The communication links 145 allow a PCD 100 to establish virtual links 150 with each other via the CMM server 105.

Figure 4:
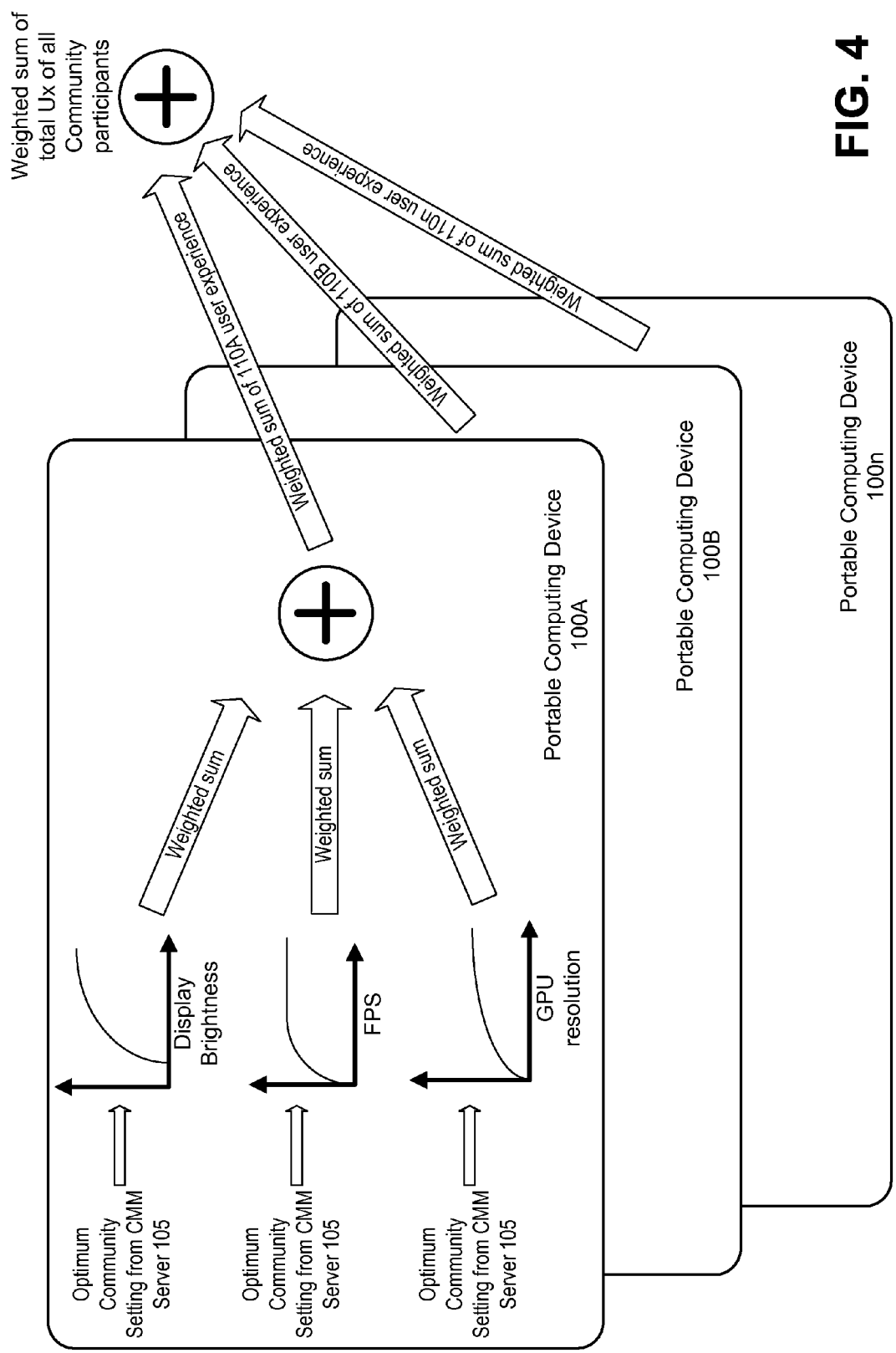
FIG. 4 illustrates a community of PCDs participating in a multimedia conferencing event in the system of FIG. 3.

FIG. 4 illustrates a community of PCDs 100 participating in a multimedia conferencing event in system 300. In the FIG. 4 illustration, the system 300 may employ an embodiment of a method for balancing Ux across a multimedia conferencing community using a CMM server 105, as described above. Advantageously, using the CMM server 105 for setting visual multimedia parameters in each of PCDs 100, the overall user experience of the community may be quantified and optimized. Moreover, it is envisioned that in some embodiments a certain one "master" PCD in a community may perform the functions of the CMM server 105 and, as such, the particular embodiments described herein to include a CMM server 105 are not meant to limit those embodiments to a system that includes a CMM server 105.

Notably, and as described above, it is envisioned that certain embodiments of the systems and methods may determine visual multimedia parameter settings within on-chip systems 102 of individual PCDs 100 and then share those settings with companion PCDs 100 in the community which are participating in a multimedia conferencing event. However, it is also envisioned that certain embodiments, in lieu of individual on-chip systems 102 setting visual multimedia parameters for the purpose of optimizing Ux in a specific PCD 100, will set visual multimedia parameters across the community such that the aggregate Ux of all PCDs 100 participating in a multimedia conferencing event will be maximized. In such a scenario, the optimization of a particular PCD 100 may be sacrificed in favor of the interests of the entire community.

For each PCD 100, the optimum community setting for a given visual multimedia parameter may be received from the CMM server 105 and applied by the IM-TPM module 101. By applying the optimum community setting, the weighted sums of the visual multimedia parameters may be quantified for each PCD 100. Advantageously, the weighted sums of each PCD 100 may be aggregated for an optimized weighted sum of Ux for the community as a whole.

Figure 5:
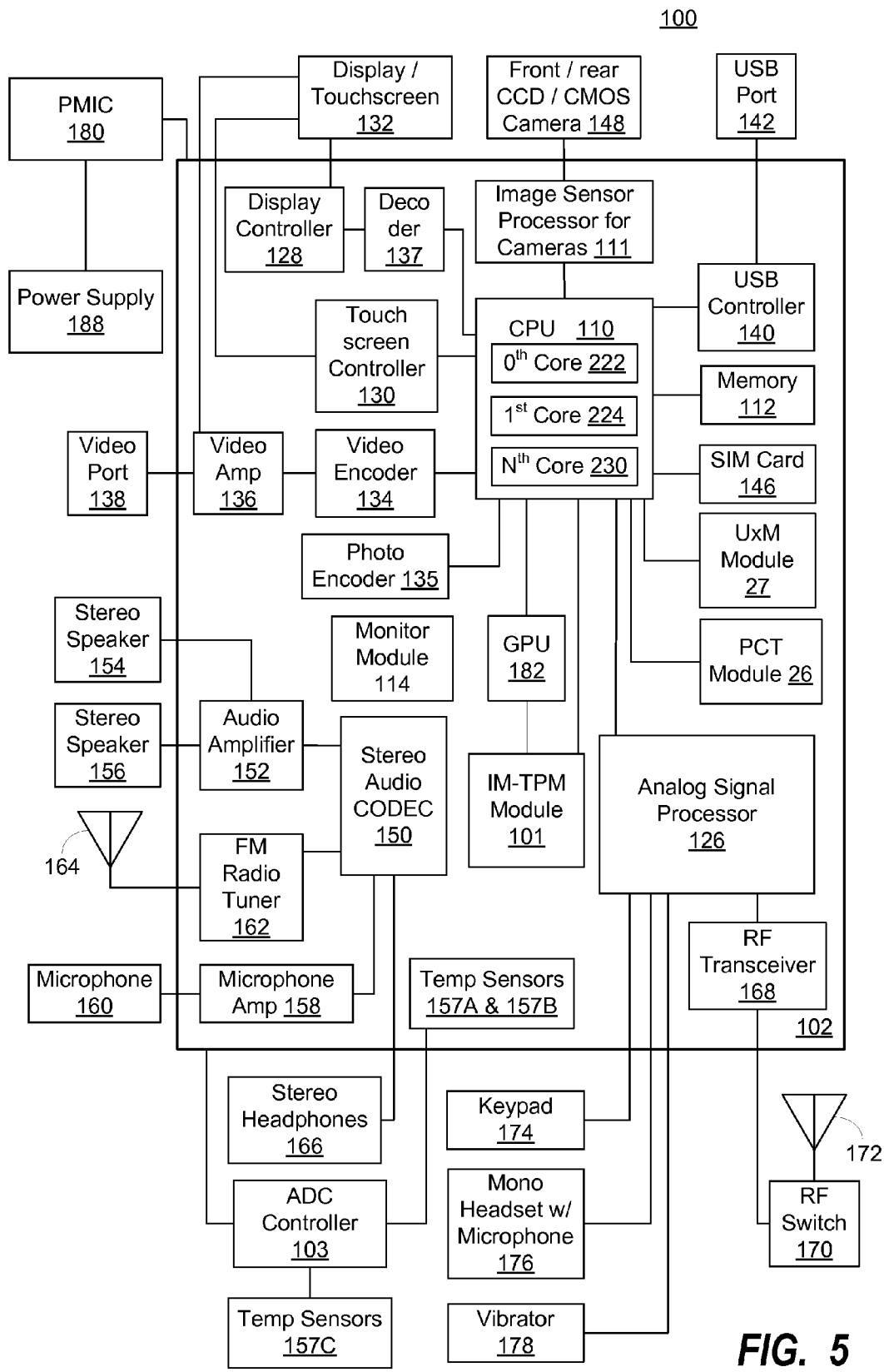
FIG. 5 is a functional block diagram illustrating an exemplary, non-limiting aspect of the PCD of FIGS. 2-4 in the form of a wireless telephone for implementing methods and systems for intelligent multimedia-based thermal power management and balanced user experience across a multimedia conferencing community.

FIG. 5 is a functional block diagram illustrating an exemplary, non-limiting aspect of the PCD 100 of FIGS. 2-4 in the form of a wireless telephone for implementing methods and systems for intelligent multimedia-based thermal power management and balanced user experience across a multimedia conferencing community. As shown, the PCD 100 includes an on-chip system 102 that includes a multi-core central processing unit ("CPU") 110 and an analog signal processor 126 that are coupled together. The CPU 110 may comprise a zeroth core 222, a first core 224, and an Nth core 230 as understood by one of ordinary skill in the art. Further, instead of a CPU 110, a digital signal processor ("DSP") may also be employed as understood by one of ordinary skill in the art.

In general, the PCT module 26, Ux model module 27 and IM-TPM module 101 may be collectively responsible for selecting and making adjustments to visual multimedia parameters associated with multimedia processing components, such as GPU 182, such that power consumption (and, by extension, thermal energy generation) is managed and user experience is optimized. The IM-TPM module 101 may also be responsible for sharing the settings of the visual multimedia parameters with companion PCDs in a community. Moreover, the PCT module 26 may be responsible for recognizing that an active use case in the PCD 100 includes multiple running applications and determining portions of an overall power budget that should be allocated to each.

The monitor module 114 communicates with multiple operational sensors (e.g., thermal sensors 157A, 157B) distributed throughout the on-chip system 102 and with the CPU 110 of the PCD 100 as well as with the Ux model module 27 and PCT module 26. In some embodiments, monitor module 114 may also monitor skin temperature sensors 157C for temperature readings associated with a touch temperature of PCD 100. In other embodiments, monitor module 114 may infer touch temperatures based on a likely delta with readings taken by on chip temperature sensors 157A, 157B. The PCT module 26 may work with the monitor module 114 to identify temperature thresholds that have been exceeded and instruct the application of visual multimedia parameter adjustments associated with power consuming components within chip 102 in an effort to reduce the temperatures without unnecessarily impacting user experience.

As illustrated in FIG. 5, a display controller 128, a video decoder 137 and a touch screen controller 130 are coupled to the digital signal processor 110. A touch screen display 132 external to the on-chip system 102 is coupled to the display controller 128 and the touch screen controller 130. PCD 100 may further include a video encoder 134, e.g., a phase-alternating line ("PAL") encoder, a sequential couleur avec memoire ("SECAM") encoder, a national television system(s) committee ("NTSC") encoder or any other type of video encoder 134. The video encoder 134 is coupled to the multi-core central processing unit ("CPU") 110. A video amplifier 136 is coupled to the video encoder 134 and the touch screen display 132. A video port 138 is coupled to the video amplifier 136. As depicted in FIG. 5, a universal serial bus ("USB") controller 140 is coupled to the CPU 110. Also, a USB port 142 is coupled to the USB controller 140. A memory 112 and a subscriber identity module ("SIM") card 146 may also be coupled to the CPU 110. Further, as shown in FIG. 5, a digital camera 148 may be coupled to the CPU 110. In an exemplary aspect, the digital camera 148 is a charge-coupled device ("CCD") camera or a complementary metal-oxide semiconductor ("CMOS") camera.

As further illustrated in FIG. 5, a stereo audio CODEC 150 may be coupled to the analog signal processor 126. Moreover, an audio amplifier 152 may be coupled to the stereo audio CODEC 150. In an exemplary aspect, a first stereo speaker 154 and a second stereo speaker 156 are coupled to the audio amplifier 152. FIG. 5 shows that a microphone amplifier 158 may also be coupled to the stereo audio CODEC 150. Additionally, a microphone 160 may be coupled to the microphone amplifier 158. In a particular aspect, a frequency modulation ("FM") radio tuner 162 may be coupled to the stereo audio CODEC 150. Also, an FM antenna 164 is coupled to the FM radio tuner 162. Further, stereo headphones 166 may be coupled to the stereo audio CODEC 150.

FIG. 5 further indicates that a radio frequency ("RF") transceiver 168 may be coupled to the analog signal processor 126. An RF switch 170 may be coupled to the RF transceiver 168 and an RF antenna 172. As shown in FIG. 5, a keypad 174 may be coupled to the analog signal processor 126. Also, a mono headset with a microphone 176 may be coupled to the analog signal processor 126. Further, a vibrator device 178 may be coupled to the analog signal processor 126. FIG. 5 also shows that a power supply 188, for example a battery, is coupled to the on-chip system 102 through power management integrated circuit ("PMIC') 180. In a particular aspect, the power supply includes a rechargeable DC battery or a DC power supply that is derived from an alternating current ("AC") to DC transformer that is connected to an AC power source.

The CPU 110 may also be coupled to one or more internal, on-chip thermal sensors 157A as well as one or more external, off-chip thermal sensors 157C. The on-chip thermal sensors 157A may comprise one or more proportional to absolute temperature ("PTAT") temperature sensors that are based on vertical PNP structure and are usually dedicated to complementary metal oxide semiconductor ("CMOS") very large-scale integration ("VLSI") circuits. The off-chip thermal sensors 157C may comprise one or more thermistors. The thermal sensors 157C may produce a voltage drop that is converted to digital signals with an analog-to-digital converter ("ADC") controller 103. However, other types of thermal sensors 157A, 157B, 157C may be employed without departing from the scope of the invention.

The PCT module(s) 26, Ux model module(s) 27 and/or IM-TPM module(s) 101 may comprise software which is executed by the CPU 110. However, the PCT module(s) 26, Ux model module(s) 27 and IM-TPM module(s) 101 may also be formed from hardware and/or firmware without departing from the scope of the invention. The PCT module 26, Ux model module 27 and IM-TPM module 101 may be collectively responsible for selecting and making adjustments to visual multimedia parameters associated with multimedia processing components, such as GPU 182, such that power consumption (and, by extension, thermal energy generation) is managed and user experience is optimized.

The touch screen display 132, the video port 138, the USB port 142, the camera 148, the first stereo speaker 154, the second stereo speaker 156, the microphone 160, the FM antenna 164, the stereo headphones 166, the RF switch 170, the RF antenna 172, the keypad 174, the mono headset 176, the vibrator 178, the power supply 188, the PMIC 180 and the thermal sensors 157C are external to the on-chip system 102. However, it should be understood that the monitor module 114 may also receive one or more indications or signals from one or more of these external devices by way of the analog signal processor 126 and the CPU 110 to aid in the real time management of the resources operable on the PCD 100.

In a particular aspect, one or more of the method steps described herein may be implemented by executable instructions and parameters stored in the memory 112 that form the one or more PCT module(s) 26, Ux model module(s) 27 and/or IM-TPM module(s) 101. These instructions that form the module(s) 101, 26, 27 may be executed by the CPU 110, the analog signal processor 126, or another processor, in addition to the ADC controller 103 to perform the methods described herein. Further, the processors 110, 126, the memory 112, the instructions stored therein, or a combination thereof may serve as a means for performing one or more of the method steps described herein.

Figure 6:
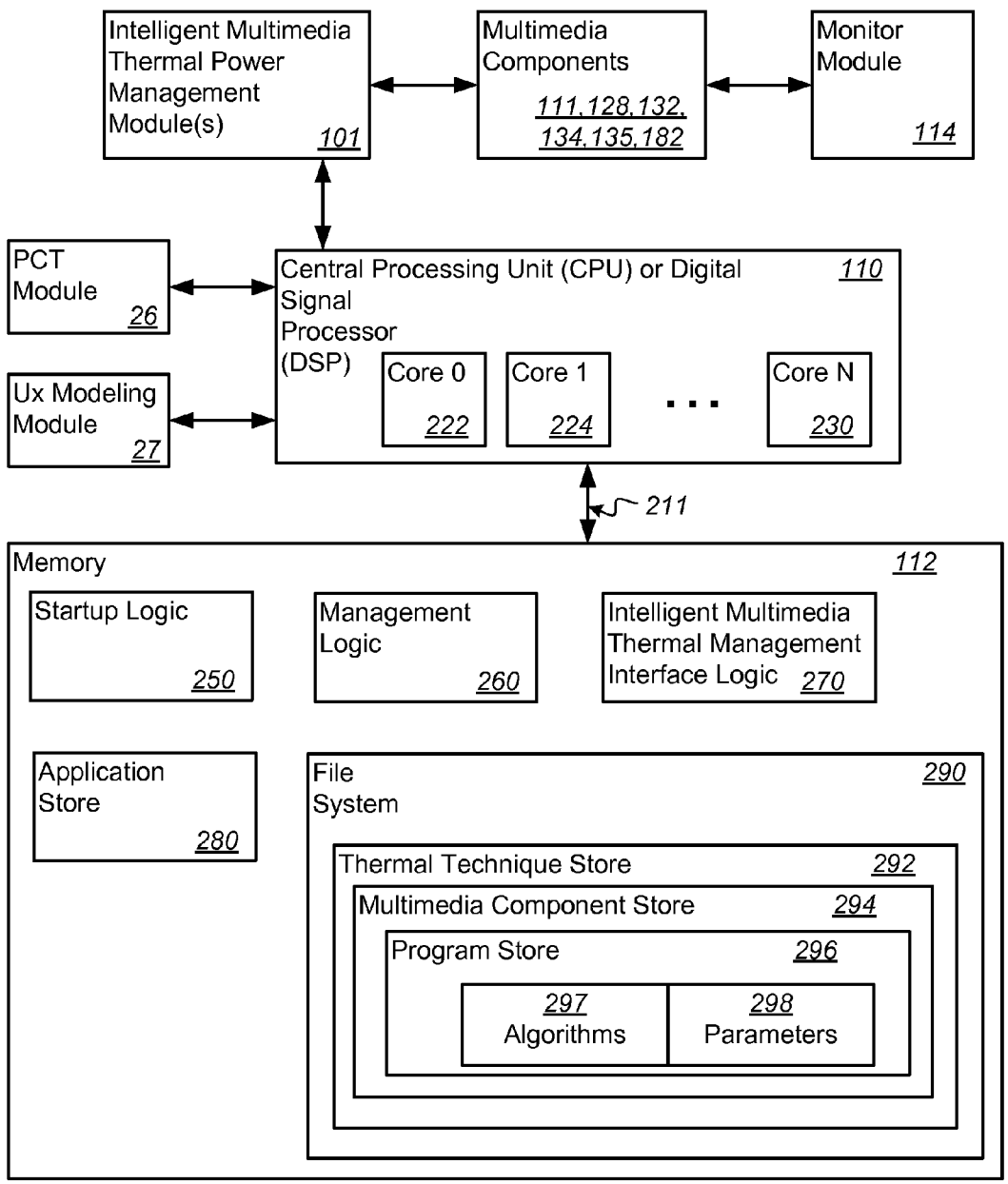
FIG. 6 is a schematic diagram illustrating an exemplary software architecture of the PCD of FIG. 5 for intelligent multimedia-based thermal power management and balanced user experience across a multimedia conferencing community.

FIG. 6 is a schematic diagram illustrating an exemplary software architecture of the PCD 100 of FIG. 5 for intelligent multimedia-based thermal power management and balanced user experience across a multimedia conferencing community. Any number of algorithms may form or be part of at least one intelligent multimedia thermal power management and/or user experience optimization policy that may be applied by the PCT module(s) 26, Ux model module(s) 27 and/or IM-TPM module(s) 101 when certain thermal conditions and/or power constraints are met; however, in a preferred embodiment the PCT module(s) 26, Ux model module(s) 27 and IM-TPM module(s) 101 work together to incrementally adjust settings of visual multimedia parameters 28 associated with multimedia processing components including, but not limited to, display controller 128, GPU 182, display 132, a video/photo encoder 134,135, and an image sensor processor for front/rear cameras 111.

As illustrated in FIG. 6, the CPU or digital signal processor 110 is coupled to the memory 112 via a bus 211. The CPU 110, as noted above, is a multiple-core processor having N core processors. That is, the CPU 110 includes a first core 222, a second core 224, and an $N^{th}$ core 230. As is known to one of ordinary skill in the art, each of the first core 222, the second core 224 and the $N^{th}$ core 230 are available for supporting a dedicated application or program. Alternatively, one or more applications or programs can be distributed for processing across two or more of the available cores.

The CPU 110 may receive commands from the PCT module(s) 26, Ux model module(s) 27 and/or IM-TPM module(s) 101 that may comprise software and/or hardware. If embodied as software, the module(s) 26, 27, 101 comprise instructions that are executed by the CPU 110 that issues commands to other application programs being executed by the CPU 110 and other processors.

The first core 222, the second core 224 through to the Nth core 230 of the CPU 110 may be integrated on a single integrated circuit die, or they may be integrated or coupled on separate dies in a multiple-circuit package. Designers may couple the first core 222, the second core 224 through to the $N^{th}$ core 230 via one or more shared caches and they may implement message or instruction passing via network topologies such as bus, ring, mesh and crossbar topologies.

Bus 211 may include multiple communication paths via one or more wired or wireless connections, as is known in the art. The bus 211 may have additional elements, which are omitted for simplicity, such as controllers, buffers (caches), drivers, repeaters, and receivers, to enable communications. Further, the bus 211 may include address, control, and/or data connections to enable appropriate communications among the aforementioned components.

When the logic used by the PCD 100 is implemented in software, as is shown in FIG. 6, it should be noted that one or more of startup logic 250, management logic 260, intelligent multimedia thermal power management interface logic 270, applications in application store 280 and portions of the file system 290 may be stored on any computer-readable medium for use by, or in connection with, any computer-related system or method.

In the context of this document, a computer-readable medium is an electronic, magnetic, optical, or other physical device or means that can contain or store a computer program and data for use by or in connection with a computer-related system or method. The various logic elements and data stores may be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device.

The computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random-access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, for instance via optical scanning of the paper or other medium, then compiled, interpreted or otherwise processed in a suitable manner if necessary, and then stored in a computer memory.

In an alternative embodiment, where one or more of the startup logic 250, management logic 260 and perhaps the intelligent multimedia thermal power management interface logic 270 are implemented in hardware, the various logic may be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The memory 112 may be a non-volatile data storage device such as a flash memory or a solid-state memory device. Although depicted as a single device, the memory 112 may be a distributed memory device with separate data stores coupled to the digital signal processor 110 (or additional processor cores).

The startup logic 250 includes one or more executable instructions for selectively identifying, loading, and executing a select program for managing or controlling the performance of one or more of the available cores such as the first core 222, the second core 224 through to the $N^{th}$ core 230. The startup logic 250 may identify, load and execute a select program based on the comparison, by the PCT module 26, of various temperature measurements or power consumption levels with threshold temperature settings or power budget settings associated with a multimedia processing component or aspect. An exemplary select program can be found in the program store 296 of the embedded file system 290 and is defined by a specific combination of an intelligent multimedia algorithm 297 and a set of parameters 298. The exemplary select program, when executed by one or more of the core processors in the CPU 110 may operate in accordance with one or more signals provided by the monitor module 114 in combination with control signals provided by the one or more PCT module(s) 26, Ux model module(s) 27 and/or IM-TPM module(s) 101 to adjust the setting associated with a particular visual multimedia parameter "up" or "down" and then share those settings with companion PCDs in a networked community.

The management logic 260 includes one or more executable instructions for terminating an intelligent multimedia thermal power management program, as well as selectively identifying, loading, and executing a more suitable replacement program. The management logic 260 is arranged to perform these functions at run time or while the PCD 100 is powered and in use by an operator of the device. A replacement program can be found in the program store 296 of the embedded file system 290 and, in some embodiments, may be defined by a specific combination of an intelligent multimedia algorithm 297 and a set of parameters 298.

The replacement program, when executed by one or more of the core processors in the digital signal processor may operate in accordance with one or more signals provided by the monitor module 114 or one or more signals provided on the respective control inputs of the various processor cores to adjust the settings of one or more visual multimedia parameters 28 associated with multimedia processing components 128, 182 and 132.

The interface logic 270 includes one or more executable instructions for presenting, managing and interacting with external inputs to observe, configure, or otherwise update information stored in the embedded file system 290. In one embodiment, the interface logic 270 may operate in conjunction with manufacturer inputs received via the USB port 142. These inputs may include one or more programs to be deleted from or added to the program store 296. Alternatively, the inputs may include edits or changes to one or more of the programs in the program store 296. Moreover, the inputs may identify one or more changes to, or entire replacements of one or both of the startup logic 250 and the management logic 260. By way of example, the inputs may include a change to the management logic 260 that instructs the PCD 100 to suspend all visual multimedia parameter adjustments in the display 132 during a multimedia conferencing event. By way of further example, the inputs may include a change to the management logic 260 that instructs the PCD 100 to apply a desired program when a certain gaming application is running.

The interface logic 270 enables a manufacturer to controllably configure and adjust an end user's experience under defined operating conditions on the PCD 100. When the memory 112 is a flash memory, one or more of the startup logic 250, the management logic 260, the interface logic 270, the application programs in the application store 280 or information in the embedded file system 290 can be edited, replaced, or otherwise modified. In some embodiments, the interface logic 270 may permit an end user or operator of the PCD 100 to search, locate, modify or replace the startup logic 250, the management logic 260, applications in the application store 280 and information in the embedded file system 290. The operator may use the resulting interface to make changes that will be implemented upon the next startup of the PCD 100. Alternatively, the operator may use the resulting interface to make changes that are implemented during run time.

The embedded file system 290 includes a hierarchically arranged thermal technique store 292. In this regard, the file system 290 may include a reserved section of its total file system capacity for the storage of information for the configuration and management of the various parameters 298 and intelligent multimedia algorithms 297 used by the PCD 100. As shown in FIG. 6, the store 292 includes a multimedia component store 294, which includes a program store 296, which includes one or more intelligent multimedia thermal power management programs.

Figure 7:
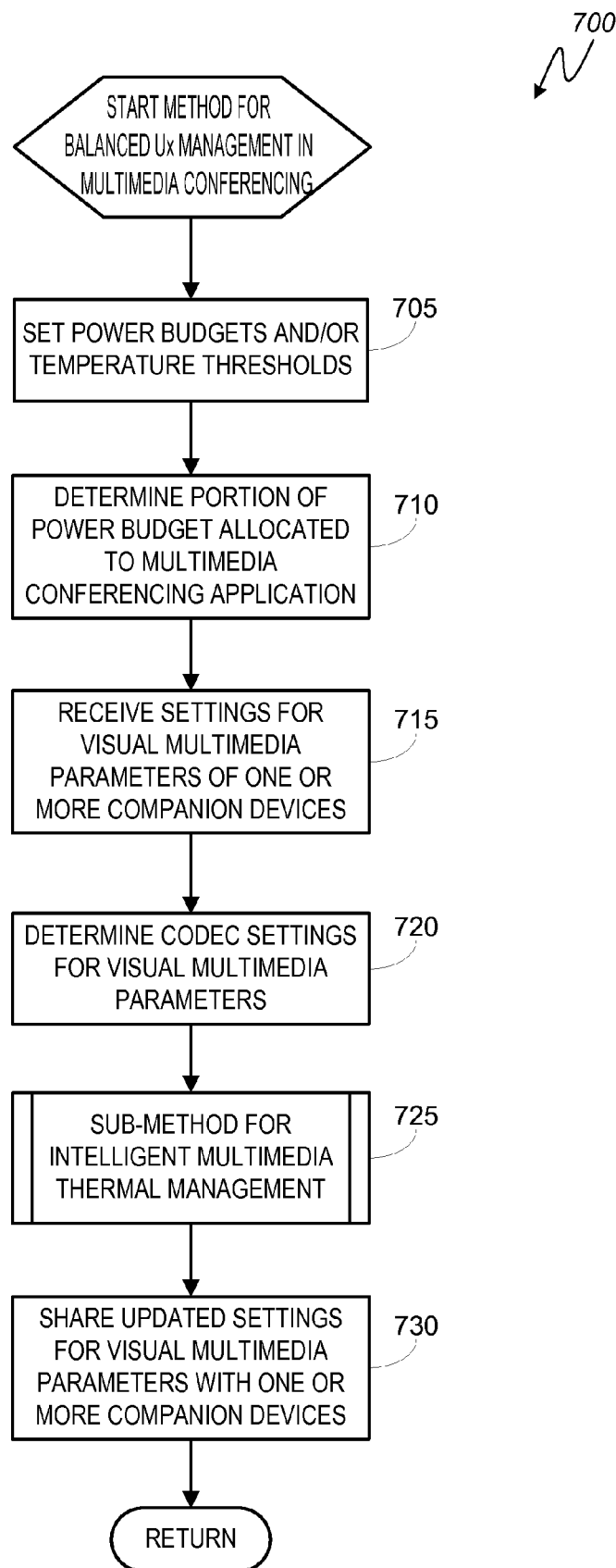
FIG. 7 depicts a logical flowchart illustrating a method for balanced user experience ("Ux") management in a networked community engaged in a multimedia conferencing event.

FIG. 7 depicts a logical flowchart illustrating a method 700 for balanced user experience ("Ux") management in a networked community engaged in a multimedia conferencing event. As described above, the networked community may be a "peer to peer" community that includes two or more PCDs directly in communication with each other or, in some embodiments, may include a CMM server 105 in communication with each of the two or more PCDs.

Beginning at block 705, power budgets and/or temperature thresholds may be set in each of the PCDs. The power budgets of each PCD may be determined within the PCD itself, or may be determined and dictated by a CMM server 105. Notably, in a scenario that includes multiple applications running simultaneously on a given PCD, at block 710 the PCT module 26 or CMM server 105 may determine what portion of an overall power budget may be allocated to a community-based application, such as a multimedia conferencing event.

At block 715, multimedia parameter settings associated with companion PCDs in the networked community may be received by an IM-TPM module 101 of a given PCD by way of side band communications through a network 130. Based on the multimedia parameter settings of the one or more companion PCDs, at block 720 the IM-TPM module 101 of the given PCD may adjust its own codec settings associated with processing multimedia workloads for the multimedia conferencing event. In this way, the given PCD may conserve power by not generating multimedia data that is not needed by a companion PCD and, therefore, optimize its own QoS within a power budget allocation.

At block 725, the IM-TPM module 101, PCT module 26 and/or Ux modeling module 27 may engage in a sub-method for intelligent multimedia thermal management where optimum visual multimedia parameter settings are determined and applied within the PCD. Notably, the optimum visual multimedia parameter settings determined at block 725 may be based on the shared settings of companion PCDs received at block 715. In this way, the portion of an overall power budget allocated to the multimedia conferencing event application may be efficiently used to optimize the QoS delivered to a user of the given PCD 100.

At block 730, the give PCD 100 may share its updated settings with companion PCDs in the community so that, in turn, the companion PCDs may also optimize their delivered QoS via encoding parameters that meet the requirements of the PCD 100, and vice versa. In this way, the overall Ux may be balanced across the community of PCDs so that each PCD participating in the multimedia conferencing event optimizes the QoS it delivers to its associated user.

Figure 8:
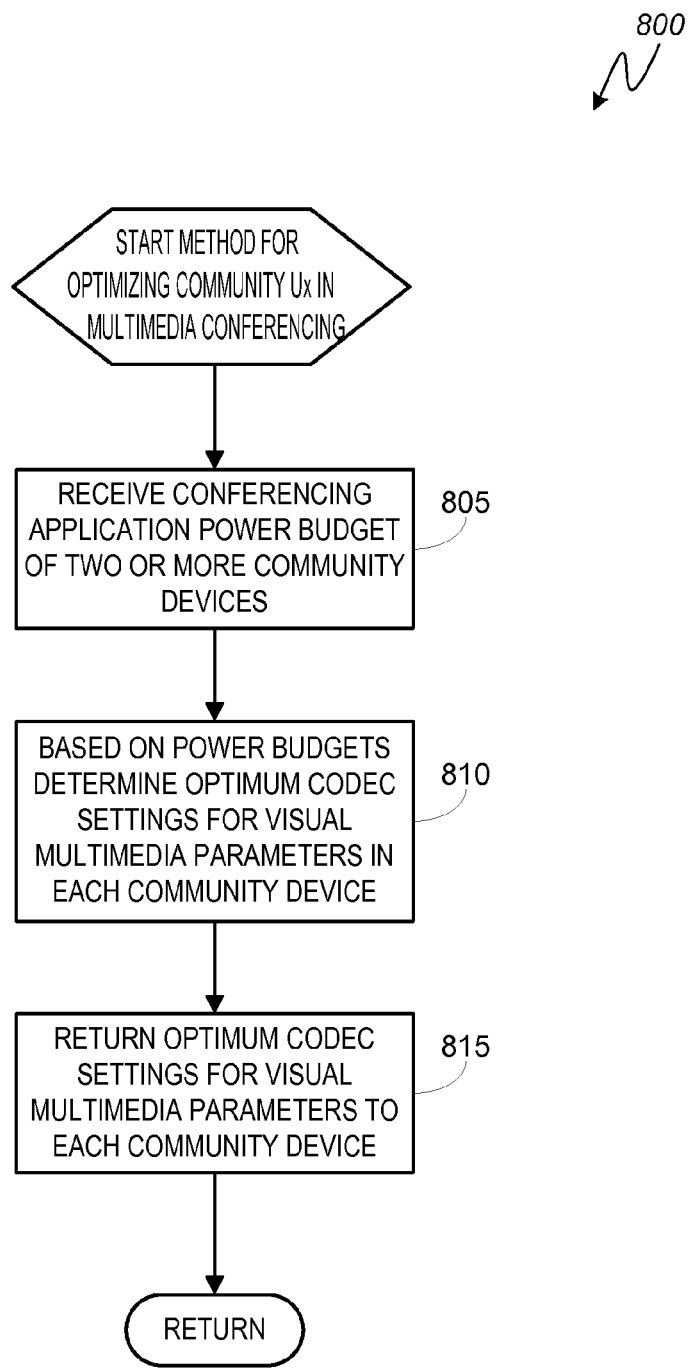
FIG. 8 depicts a logical flowchart illustrating a method for optimizing a community-wide user experience ("Ux") in a networked community that includes two or more PCDs engaged in a multimedia conferencing event.

FIG. 8 depicts a logical flowchart illustrating a method 800 for optimizing a community-wide user experience ("Ux") in a networked community that includes two or more PCDs engaged in a multimedia conferencing event. As described above, the networked community may be a "peer to peer" community that includes two or more PCDs directly in communication with each other (with a certain PCD being a "master" PCD) or, in some embodiments, may include a CMM server 105 in communication with each of the two or more PCDs.

At block 805, the power budget allocation for each of two or more PCDs participating in a community-based multimedia conferencing event may be received. Notably, with the power budget allocations, optimum settings for multimedia parameters in each PCD may be determined such that an average QoS delivered to any given user of PCD engaged in the conferencing event is optimized. In other embodiments, optimum settings for multimedia parameters in each PCD may be determined such that the unique QoS experience by a given user of a PCD engaged in the conferencing event is optimized. Accordingly, at block 810, the optimum settings for the multimedia parameters in each PCD are determined. And, at block 815 the optimum settings for each PCD are returned to the appropriate PCD so that the settings may be applied.

Figure 9A:
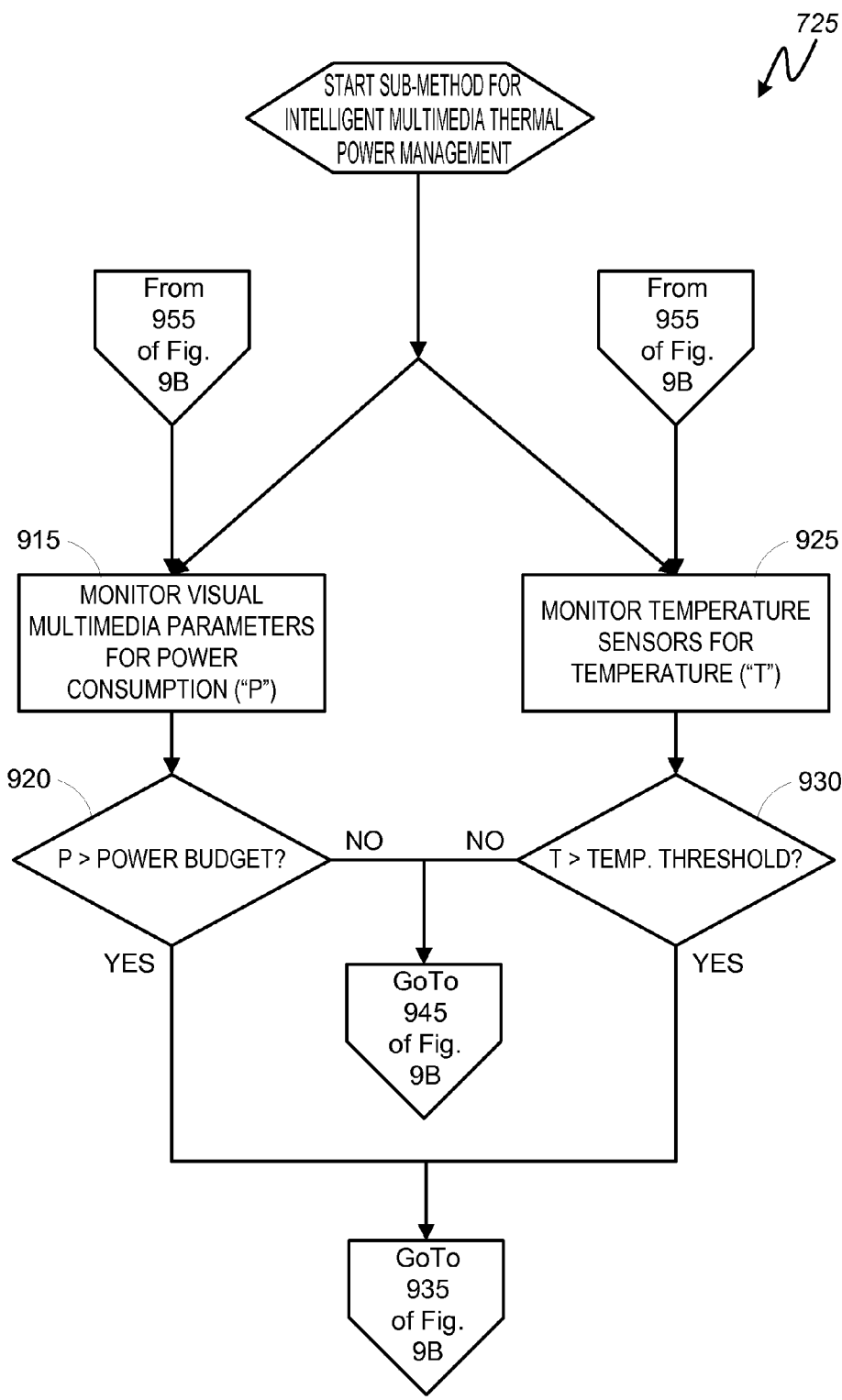
FIGS. 9A-9B depict a logical flowchart illustrating a sub-method for intelligent multimedia-based management of thermal energy generation in a PCD through selective adjustment of one or more visual multimedia parameters.
Figure 9B:
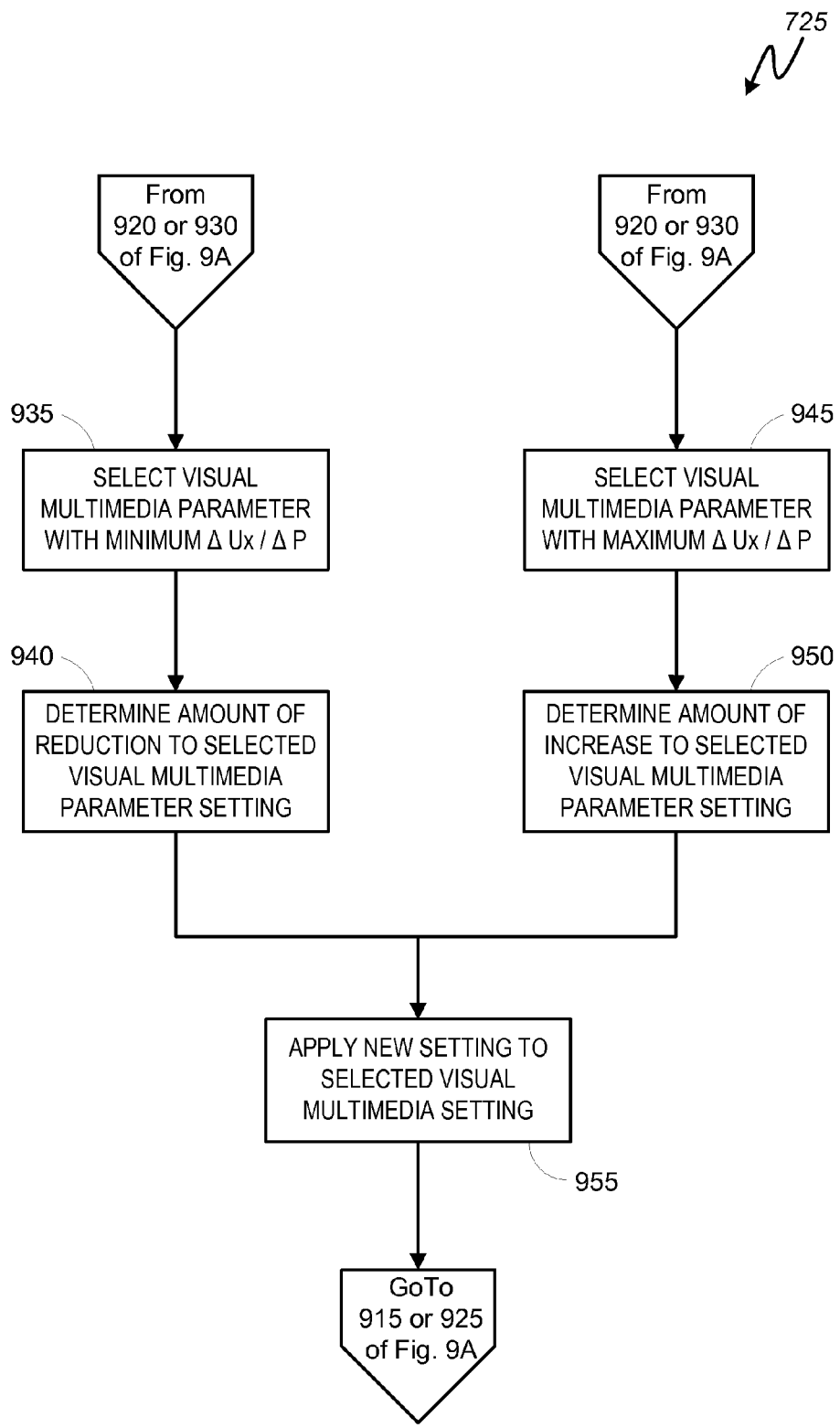

FIGS. 9A-9B depict a logical flowchart illustrating a sub-method 725 for intelligent multimedia-based management of thermal energy generation in a PCD 100 through selective adjustment of one or more visual multimedia parameters 28. In certain embodiments, the multimedia parameters 28 may be selectively adjusted based on settings of multimedia parameters in companion PCDs in a networked community.

Method 725 of FIG. 9 starts with a first block 905 where predefined power budget(s) and/or temperature thresholds associated with sensors 157 are set. Notably, a predefined power budget may be a portion of an overall power budget that has been allocated to a certain multimedia application, such as a multimedia conferencing application for engaging in a community-based multimedia conferencing event. The predefined power budget may be determined based on a policy that seeks to optimize QoS across a plurality of simultaneously running applications.

As explained above, the monitor module 114 may monitor various temperature sensors 157 and/or active visual parameter settings. At block 910, default settings for visual multimedia parameters 28 are set such that multimedia workloads and multimedia output QoS are determined. The default settings may be based on settings associated with companion PCDs in a community of PCDs. Depending on the particular embodiment, from block 910 the method 725 may proceed to either or both of blocks 915 and 925.

At block 915, the monitor module 114 monitors the active settings of the various visual multimedia parameters 28 and supplies associated data to the PCT module 26 which, based on the active settings, calculates an aggregate power consumption level associated with the various multimedia processing components. At decision block 920, the PCT module 26 determines whether the aggregate power consumption exceeds the power budget set at block 905. If the aggregate power consumption does exceed the power budget, then the "yes" branch is followed to block 935 of FIG. 5B. If the aggregate power consumption does not exceed the power budget, then the "no" branch is followed to block 945 of FIG. 9B.

Returning to block 910, the process 725 could alternatively, or simultaneously, proceed to block 925 where the monitor module monitors the temperature readings generated by various temperature sensors 157 and supplies associated data to the PCT module 26 which determines if one or more temperature thresholds have been exceeded. At decision block 930, the PCT module 26 determines whether a temperature reading exceeds a temperature threshold set at block 905. If the temperature reading does exceed a temperature threshold, then the "yes" branch is followed to block 935 of FIG. 9B. If the temperature reading does not exceed a temperature threshold, then the "no" branch is followed to block 945 of FIG. 9B.

If the method 725 dictates that either or both of the "yes" branches are followed from blocks 920, 930, then the PCT module 26 has determined that power consumption associated with multimedia load in the PCD 100 should be reduced and the method proceeds to block 935. At block 935, the Ux model module 27 queries the LUT 29 to map active visual multimedia parameter settings to appropriate visual multimedia parameter graphs. As explained above, by doing so the Ux model module 27 may compare slopes of tangents for each of the active settings and select for adjustment the visual multimedia parameter that provides opportunity for a minimum degradation in user experience per unit decrease in power consumption. Subsequently, at block 940, the Ux model module 27 determines the amount of setting adjustment that is warranted and forwards the instruction to the IM-TPM module 101. At block 955, the IM-TPM module 101 applies the new visual multimedia parameter setting and the method 725 returns to blocks 915, 925 of FIG. 9A.

Returning to FIG. 9A, if the method 725 dictates that either or both of the "no" branches are followed from blocks 920, 930, then the PCT module 26 has determined that power consumption associated with multimedia load in the PCD 100 may be increased and the method proceeds to block 945. At block 945, the Ux model module 27 queries the LUT 29 to map active visual multimedia parameter settings to appropriate visual multimedia parameter graphs. As explained above, by doing so the Ux model module 27 may compare slopes of tangents for each of the active settings and select for adjustment the visual multimedia parameter that provides opportunity for a maximum positive change in user experience per unit increase in power consumption. Subsequently, at block 950, the Ux model module 27 determines the amount of setting adjustment that is warranted and forwards the instruction to the IM-TPM module 101. At block 955, the IM-TPM module 101 applies the new visual multimedia parameter setting and the method 725 returns to blocks 915, 925 of FIG. 9A.

Certain steps in the processes or process flows described in this specification naturally precede others for the invention to function as described. However, the invention is not limited to the order of the steps described if such order or sequence does not alter the functionality of the invention. That is, it is recognized that some steps may performed before, after, or parallel (substantially simultaneously with) other steps without departing from the scope and spirit of the invention. In some instances, certain steps may be omitted or not performed without departing from the invention. Further, words such as "thereafter", "then", "next", etc. are not intended to limit the order of the steps. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the drawings, which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another. A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for balancing user experience in a multimedia conferencing community using intelligent multimedia-based thermal power management in a portable computing device ("PCD"), the method comprising:

receiving data for one or more visual multimedia parameter settings in a companion PCD, each PCD comprising thermal policy manager module coupled to a graphics processing unit (GPU) and an encoder, the thermal policy manager module capable of adjusting codec settings for encoding and decoding multimedia data packets used by the encoder in order to conserve power when the PCD is receiving energy from a finite power supply;

for each visual multimedia parameter setting, determining a relationship between a respective visual multimedia parameter setting and user experience relative to the visual multimedia parameter setting and power consumption associated with the respective visual multimedia parameter setting;

based on the visual multimedia parameter settings in a companion PCD, the thermal policy manager determining an adjustment to one or more visual multimedia parameter settings that include codec settings in the PCD, wherein the settings of the one or more visual multimedia parameters contributes to an overall multimedia workload in the PCD;

adjusting the one or more visual multimedia parameter settings according to the determined adjustment, wherein adjusting the settings modifies a multimedia output.

2. The method of claim 1, wherein determining a relationship between a respective visual multimedia parameter setting and user experience relative to the visual multimedia parameter setting and power consumption associated with the visual multimedia parameter setting comprises:

monitoring a condition in the PCD associated with power consumption;

comparing the condition to a predefined threshold associated with the condition;

based on the comparison of the condition to the predefined threshold, determining an adjustment to power consumption;

receiving data for active settings of the one or more visual multimedia parameters in the PCD;

querying performance graphs for each of the visual multimedia parameters and mapping the active setting data of each visual multimedia parameter to its respective curve, wherein the active setting data defines a tangent with a slope;

comparing the tangent slopes associated with each visual multimedia parameter;

based on the comparison of tangent slopes, selecting a first visual multimedia parameter;

adjusting the active setting of the first visual multimedia parameter, wherein adjusting the active setting modifies the overall multimedia workload such that power consumption in the PCD is adjusted; and sharing the adjusted active setting of the first visual multimedia parameter with one or more companion PCDs.

3. The method of claim 2, wherein:

determining an adjustment to power consumption comprises determining a reduction in power consumption;

selecting a first visual multimedia parameter based on the comparison of tangent slopes comprises selecting the visual multimedia parameter for which adjustment of the active setting will provide the least detrimental impact on user experience per unit reduction in power consumption; and modifying the overall multimedia workload comprises reducing the overall multimedia workload such that the power consumption in the PCD is reduced.

4. The method of claim 3, further comprising:

determining that an additional reduction in power consumption in the PCD is warranted;

based on the comparison of tangent slopes, selecting a second visual multimedia parameter;

adjusting the active setting of the second visual multimedia parameter, wherein adjusting the active setting modifies the overall multimedia workload such that power consumption in the PCD is further reduced; and sharing the adjusted active setting of the second visual multimedia parameter with one or more companion PCDs.

5. The method of claim 2, wherein:

determining an adjustment to power consumption comprises determining an increase in power consumption;

selecting a first visual multimedia parameter based on the comparison of tangent slopes comprises selecting the visual multimedia parameter for which adjustment of the active setting will provide the most positive impact on user experience per unit increase in power consumption; and modifying the overall multimedia workload comprises increasing the overall multimedia workload such that power consumption in the PCD is increased.

6. The method of claim 5, further comprising:

determining that an additional increase in power consumption in the PCD is acceptable;

based on the comparison of tangent slopes, selecting a second visual multimedia parameter;

adjusting the active setting of the second visual multimedia parameter, wherein adjusting the active setting modifies the overall multimedia workload such that power consumption in the PCD is further increased; and sharing the adjusted active setting of the second visual multimedia parameter with one or more companion PCDs.

7. The method of claim 2, wherein the first visual multimedia parameter is selected from a group of parameters comprising a frame per second processing rate, a color depth setting, an image dynamics algorithm selection, a display brightness setting, image/video filtering, image/video compression method, target bit-rates, and a resolution scaling ratio.

8. The method of claim 1, wherein the multimedia output is in the form of an encoded data packet stream.

9. A computer system for balancing user experience in a multimedia conferencing community using intelligent multimedia-based thermal power management in a portable computing device ("PCD"), the system comprising:

a thermal policy manager module coupled to a graphics processing unit (GPU) and an encoder, the thermal policy manager module capable of adjusting codec settings for encoding and decoding multimedia data packets used by the encoder in order to conserve power when the PCD is receiving energy from a finite power supply, the thermal policy manager configured to:

receive data for one or more visual multimedia parameter settings in a companion PCD;

receive a selection of one or more visual multimedia parameter settings from a user experience modeling module that queries performance data for each of the visual multimedia parameters;

based on the visual multimedia parameter settings in a companion PCD, determine an adjustment to one or more visual multimedia parameter settings that include codec settings in the PCD, wherein the settings of the one or more visual multimedia parameters contributes to an overall multimedia workload in the PCD;

adjust the one or more visual multimedia parameter settings according to the determined adjustment, wherein adjusting the settings modifies a multimedia output.

10. The computer system of claim 9, further comprising:

a power consumption and temperature ("PCT") module configured to:

monitor a condition in the PCD associated with power consumption;

compare the condition to a predefined threshold associated with the condition; and based on the comparison of the condition to the predefined threshold, determine an adjustment to power consumption;
the user experience ("Ux") modeling module configured to:
receive data indicative of active settings of the one or more visual multimedia parameters in the PCD;
query performance graphs for each of the visual multimedia parameters and mapping the active setting data of each visual multimedia parameter to its respective curve, wherein the active setting data defines a tangent with a slope;
compare the tangent slopes associated with each visual multimedia parameter; and
based on the comparison of tangent slopes, select a first visual multimedia parameter; and
the thermal policy manager module configured to:
adjust the active setting of the first visual multimedia parameter, wherein adjusting the active setting modifies the overall multimedia workload such that power consumption in the PCD is adjusted; and
share the adjusted active setting of the first visual multimedia parameter with one or more companion PCDs.

11. The computer system of claim 10, wherein:
determining an adjustment to power consumption comprises determining a reduction in power consumption;
selecting a first visual multimedia parameter based on the comparison of tangent slopes comprises selecting the visual multimedia parameter for which adjustment of the active setting will provide the least detrimental impact on user experience per unit reduction in power consumption; and
modifying the overall multimedia workload comprises reducing the overall multimedia workload such that the power consumption in the PCD is reduced.

12. The computer system of claim 11, further comprising:
the PCT module being configured to:
determine that an additional reduction in power consumption in the PCD is warranted;
the Ux modeling module being configured to:
based on the comparison of tangent slopes, select a second visual multimedia parameter; and
the IM-TPM module being configured to:
adjust the active setting of the second visual multimedia parameter, wherein adjusting the active setting modifies the overall multimedia workload such that power consumption in the PCD is further reduced; and
share the adjusted active setting of the second visual multimedia parameter with one or more companion PCDs.

13. The computer system of claim 10, wherein:
determining an adjustment to power consumption comprises determining an increase in power consumption;
selecting a first visual multimedia parameter based on the comparison of tangent slopes comprises selecting the visual multimedia parameter for which adjustment of the active setting will provide the most positive impact on user experience per unit increase in power consumption; and
modifying the overall multimedia workload comprises increasing the overall multimedia workload such that power consumption in the PCD is increased.

14. The computer system of claim 13, further comprising:
the PCT module being configured to:
determine that an additional increase in power consumption in the PCD is acceptable;
the Ux modeling module being configured to:
based on the comparison of tangent slopes, select a second visual multimedia parameter; and
the IM-TPM module being configured to:
adjust the active setting of the second visual multimedia parameter, wherein adjusting the active setting modifies the overall multimedia workload such that power consumption in the PCD is further increased; and
share the adjusted active setting of the second visual multimedia parameter with one or more companion PCDs.

15. The computer system of claim 10, wherein the first visual multimedia parameter is selected from a group of parameters comprising a frame per second processing rate, a color depth setting, an image dynamics algorithm selection, a display brightness setting, image/video filtering, image/video compression method, target bit-rates, and a resolution scaling ratio.

16. The computer system of claim 9, wherein the multimedia output is in the form of an encoded data packet stream.

17. A computer system for balancing user experience in a multimedia conferencing community using intelligent multimedia-based thermal power management in a portable computing device ("PCD"), the system comprising:
means for receiving data indicative of one or more visual multimedia parameter settings in a companion PCD, each PCD comprising a thermal policy manager module coupled to a graphics processing unit (GPU) and an encoder, the thermal policy manager module capable of adjusting codec settings for encoding and decoding multimedia data packets used by the encoder in order to conserve power when the PCD is receiving energy from a finite power supply;
means for determining a relationship between a respective visual multimedia parameter setting and user experience relative to the visual multimedia parameter setting and power consumption associated with the respective visual multimedia parameter setting;
based on the visual multimedia parameter settings in a companion PCD, means within the thermal policy manager for determining an adjustment to one or more visual multimedia parameter settings that include codec settings in the PCD, wherein the settings of the one or more visual multimedia parameters contributes to an overall multimedia workload in the PCD;
means for adjusting the one or more visual multimedia parameter settings according to the determined adjustment, wherein adjusting the settings modifies a multimedia output.

18. The computer system of claim 17, wherein the means for determining a relationship between a respective visual multimedia parameter setting and user experience relative to the visual multimedia parameter setting and power consumption associated with the visual multimedia parameter setting further comprises:
means for monitoring a condition in the PCD associated with power consumption;
means for comparing the condition to a predefined threshold associated with the condition;
based on the comparison of the condition to the predefined threshold, means for determining an adjustment to power consumption;
means for receiving data indicative of active settings of the one or more visual multimedia parameters in the PCD;
means for querying performance graphs for each of the visual multimedia parameters and mapping the active setting data of each visual multimedia parameter to its respective curve, wherein the active setting data defines a tangent with a slope;

means for comparing the tangent slopes associated with each visual multimedia parameter;

based on the comparison of tangent slopes, means for selecting a first visual multimedia parameter;

means for adjusting the active setting of the first visual multimedia parameter, wherein adjusting the active setting modifies the overall multimedia workload such that power consumption in the PCD is adjusted; and means for sharing the adjusted active setting of the first visual multimedia parameter with one or more companion PCDs.

19. The computer system of claim 18, wherein:

means for determining an adjustment to power consumption comprises determining a reduction in power consumption;

means for selecting a first visual multimedia parameter based on the comparison of tangent slopes comprises selecting the visual multimedia parameter for which adjustment of the active setting will provide the least detrimental impact on user experience per unit reduction in power consumption; and means for modifying the overall multimedia workload comprises reducing the overall multimedia workload such that the power consumption in the PCD is reduced.

20. The computer system of claim 19, further comprising:

means for determining that an additional reduction in power consumption in the PCD is warranted;

based on the comparison of tangent slopes, means for selecting a second visual multimedia parameter;

means for adjusting the active setting of the second visual multimedia parameter, wherein adjusting the active setting modifies the overall multimedia workload such that power consumption in the PCD is further reduced; and means for sharing the adjusted active setting of the second visual multimedia parameter with one or more companion PCDs.

21. The computer system of claim 18, wherein:

means for determining an adjustment to power consumption comprises determining an increase in power consumption;

means for selecting a first visual multimedia parameter based on the comparison of tangent slopes comprises selecting the visual multimedia parameter for which adjustment of the active setting will provide the most positive impact on user experience per unit increase in power consumption; and means for modifying the overall multimedia workload comprises increasing the overall multimedia workload such that power consumption in the PCD is increased.

22. The computer system of claim 21, further comprising:

means for determining that an additional increase in power consumption in the PCD is acceptable;

based on the comparison of tangent slopes, means for selecting a second visual multimedia parameter;

means for adjusting the active setting of the second visual multimedia parameter, wherein adjusting the active setting modifies the overall multimedia workload such that power consumption in the PCD is further increased; and means for sharing the adjusted active setting of the second visual multimedia parameter with one or more companion PCDs.

23. The computer system of claim 18, wherein the first visual multimedia parameter is selected from a group of parameters comprising a frame per second processing rate, a color depth setting, an image dynamics algorithm selection, a display brightness setting, image/video filtering, image/video compression method, target bit-rates, and a resolution scaling ratio.

24. A computer program product comprising a computer usable device having a computer readable program code embodied therein, said computer readable program code adapted to be executed to implement a method for balancing user experience in a multimedia conferencing community using intelligent multimedia-based thermal power management in a portable computing device ("PCD"), said method comprising:

receiving data for one or more visual multimedia parameter settings in a companion PCD, each PCD comprising a thermal policy manager module coupled to a graphics processing unit (GPU) and an encoder, the thermal policy manager module capable of adjusting codec settings for encoding and decoding multimedia data packets used by the encoder in order to conserve power when the PCD is receiving energy from a finite power supply;

for each visual multimedia parameter setting, determining a relationship between a respective visual multimedia parameter setting and user experience relative to the visual multimedia parameter setting and power consumption associated with the respective visual multimedia parameter setting;

based on the visual multimedia parameter settings in a companion PCD, the thermal policy manager determining an adjustment to one or more visual multimedia parameter settings that include codec settings in the PCD, wherein the settings of the one or more visual multimedia parameters contributes to an overall multimedia workload in the PCD;

adjusting the one or more visual multimedia parameter settings according to the determined adjustment, wherein adjusting the settings modifies a multimedia output.

25. The computer program product of claim 24, wherein determining a relationship between a respective visual multimedia parameter setting and user experience relative to the visual multimedia parameter setting and power consumption associated with the respective visual multimedia parameter setting further comprises:

monitoring a condition in the PCD associated with power consumption;

comparing the condition to a predefined threshold associated with the condition;

based on the comparison of the condition to the predefined threshold, determining an adjustment to power consumption;

receiving data indicative of active settings of the one or more visual multimedia parameters in the PCD;

querying performance graphs for each of the visual multimedia parameters and mapping the active setting data of each visual multimedia parameter to its respective curve, wherein the active setting data defines a tangent with a slope;

comparing the tangent slopes associated with each visual multimedia parameter;

based on the comparison of tangent slopes, selecting a first visual multimedia parameter;

adjusting the active setting of the first visual multimedia parameter, wherein adjusting the active setting modifies the overall multimedia workload such that power consumption in the PCD is adjusted; and sharing the adjusted active setting of the first visual multimedia parameter with one or more companion PCDs.

26. The computer program product of claim 25, wherein:
  determining an adjustment to power consumption comprises determining a reduction in power consumption;
  selecting a first visual multimedia parameter based on the comparison of tangent slopes comprises selecting the visual multimedia parameter for which adjustment of the active setting will provide the least detrimental impact on user experience per unit reduction in power consumption; and
  modifying the overall multimedia workload comprises reducing the overall multimedia workload such that the power consumption in the PCD is reduced.

27. The computer program product of claim 26, further comprising:
  determining that an additional reduction in power consumption in the PCD is warranted;
  based on the comparison of tangent slopes, selecting a second visual multimedia parameter;
  adjusting the active setting of the second visual multimedia parameter, wherein adjusting the active setting modifies the overall multimedia workload such that power consumption in the PCD is further reduced; and
  sharing the adjusted active setting of the second visual multimedia parameter with one or more companion PCDs.

28. The computer program product of claim 25, wherein:
  determining an adjustment to power consumption comprises determining an increase in power consumption;
  selecting a first visual multimedia parameter based on the comparison of tangent slopes comprises selecting the visual multimedia parameter for which adjustment of the active setting will provide the most positive impact on user experience per unit increase in power consumption; and
  modifying the overall multimedia workload comprises increasing the overall multimedia workload such that power consumption in the PCD is increased.

29. The computer program product of claim 28, further comprising:
  determining that an additional increase in power consumption in the PCD is acceptable;
  based on the comparison of tangent slopes, selecting a second visual multimedia parameter;
  adjusting the active setting of the second visual multimedia parameter, wherein adjusting the active setting modifies the overall multimedia workload such that power consumption in the PCD is further increased; and
  sharing the adjusted active setting of the second visual multimedia parameter with one or more companion PCDs.

30. The computer program product of claim 25, wherein the first visual multimedia parameter is selected from a group of parameters comprising a frame per second processing rate, a color depth setting, an image dynamics algorithm selection, a display brightness setting, and a resolution scaling ratio.

* * * * *